United States Patent
Lowery et al.

(10) Patent No.: US 7,188,145 B2
(45) Date of Patent: Mar. 6, 2007

(54) METHOD AND SYSTEM FOR DYNAMIC DISTRIBUTED DATA CACHING

(75) Inventors: Keith A. Lowery, Richardson, TX (US); Bryan S. Chin, Plano, TX (US); David A. Consolver, Arlington, TX (US); Gregg A. DeMasters, Plano, TX (US)

(73) Assignee: EpicRealm Licensing LLC, Dallas, TX (US)

( * ) Notice: Subject to any disclaimer, the term of this patent is extended or adjusted under 35 U.S.C. 154(b) by 875 days.

(21) Appl. No.: 09/759,406

(22) Filed: Jan. 12, 2001

(65) Prior Publication Data

US 2002/0107934 A1    Aug. 8, 2002

(51) Int. Cl.
G06F 15/167    (2006.01)

(52) U.S. Cl. .................. 709/214; 709/203; 709/217; 709/219; 709/226; 707/10; 707/200; 710/56; 711/119; 711/126; 711/130; 711/135

(58) Field of Classification Search ............... 709/213, 709/217, 201, 212, 203, 205, 215, 216, 248; 707/8, 10; 711/151
See application file for complete search history.

(56) References Cited

U.S. PATENT DOCUMENTS

| | | | | |
|---|---|---|---|---|
| 4,603,382 A | * | 7/1986 | Cole et al. .................. 710/56 |
| 5,522,045 A | * | 5/1996 | Sandberg ..................... 709/215 |
| 5,537,572 A | * | 7/1996 | Michelsen et al. ........... 711/135 |
| 5,701,427 A | * | 12/1997 | Lathrop ....................... 709/237 |
| 5,778,185 A | * | 7/1998 | Gregerson et al. ........... 709/226 |
| 5,864,854 A | * | 1/1999 | Boyle .......................... 707/10 |
| 5,940,838 A | * | 8/1999 | Schmuck et al. ............ 707/200 |
| 5,968,176 A | * | 10/1999 | Nessett et al. ............... 713/201 |
| 5,987,477 A | * | 11/1999 | Schmuck et al. ............ 707/201 |
| 5,988,847 A | * | 11/1999 | McLaughlin et al. .......... 700/9 |
| 6,006,254 A | * | 12/1999 | Waters et al. ................ 709/205 |
| 6,026,474 A |   | 2/2000 | Carter et al. ................. 711/202 |
| 6,065,102 A | * | 5/2000 | Peters et al. ................. 711/151 |
| 6,098,064 A | * | 8/2000 | Pirolli et al. .................... 707/2 |

(Continued)

FOREIGN PATENT DOCUMENTS

EP    0993 163 A1    4/2000

(Continued)

OTHER PUBLICATIONS

Author: John Borland, Article entitled "Net video not yet ready for prime time", printed from web site www.cnet.com on Aug. 15, 2000.

(Continued)

*Primary Examiner*—Saleh Najjar
*Assistant Examiner*—Michael Won
(74) *Attorney, Agent, or Firm*—Baker Botts L.L.P.

(57) ABSTRACT

A method and system for dynamic distributed data caching is presented. The method includes providing a cache community (402) comprising at least one peer (413). Each peer has an associated first content portion (511) indicating content to be cached by the respective peer. A client (404) may be allowed to join the cache community. A peer list (426) associated with the cache community is updated to include the client. The peer list indicates the peers in the cache community. A respective second content portion (511) is associated with each peer based on the addition of the client.

36 Claims, 11 Drawing Sheets

U.S. PATENT DOCUMENTS

| | | | | |
|---|---|---|---|---|
| 6,112,279 | A * | 8/2000 | Wang | 711/119 |
| 6,122,629 | A * | 9/2000 | Walker et al. | 707/8 |
| 6,167,438 | A * | 12/2000 | Yates et al. | 709/216 |
| 6,167,490 | A * | 12/2000 | Levy et al. | 711/148 |
| 6,199,179 | B1 * | 3/2001 | Kauffman et al. | 714/26 |
| 6,205,481 | B1 * | 3/2001 | Heddaya et al. | 709/226 |
| 6,263,302 | B1 * | 7/2001 | Hellestrand et al. | 703/17 |
| 6,330,605 | B1 * | 12/2001 | Christensen et al. | 709/226 |
| 6,477,150 | B1 * | 11/2002 | Maggenti et al. | 370/312 |
| 6,487,583 | B1 * | 11/2002 | Harvey et al. | 709/204 |
| 6,542,926 | B2 * | 4/2003 | Zalewski et al. | 709/213 |
| 6,725,261 | B1 * | 4/2004 | Novaes et al. | 709/220 |
| 6,785,704 | B1 * | 8/2004 | McCanne | 718/105 |
| 2002/0026560 | A1 * | 2/2002 | Jordan et al. | 711/120 |
| 2002/0103972 | A1 * | 8/2002 | Satran et al. | 711/119 |

FOREIGN PATENT DOCUMENTS

WO      WO 98/22891      5/1998

OTHER PUBLICATIONS

Author: Corey Grice, Article entitled "Start-up taps swapping to ease Web bottlenecks", printed from web site www.cnet.com on Aug, 15, 2000.

Author: VTrails.com. Product information regarding company's Full Duplex Packet Cascading technology printed from web site www.vtrails.com on Aug. 15, 2000.

Author Vinod Valloppillil and Keith W. Ross, Internet-Draft document entitled "Cache Array Routing Protocol v1.0", printed from web site www.globecom.net on Nov. 14, 2000.

Author: Microsoft Corporation. Information regarding the Cache Array Routing Protocol (CARP) and Microsoft Proxy Server 2.0, printed from web site www.msdn.microsoft.com on Oct. 9, 2000.

Author: Geek.com. Information news article entitled "Cash for your unused CPU cycles", printed from web site www.geek.com on Jun. 30, 2000.

Author: Dcypher.net. Answers to frequently answered questions v1.5, printed from web site www.dcypher.net on Jun. 30, 2000.

Author: Popular Power. Information regarding the company's Popular Power for Windows software, printed from web site www.popularpower.com on Jun. 30, 2000.

Author: ProcessTree Network. Information regarding their "for-pay" distributed processing network, printed from web site www.distributedscience.com on Jun. 30, 2000.

Author: Keith Schultz, Article entitled "Pushing content to the Internet's Edge", printed from web site www.internetweek.com on Jan. 11, 2001.

U.S. Appl. No. 09/759,392, filed Jan. 12, 2001, entitled "*Method And System For Community Data Caching*,", 78 total pages.

Greg Barish, et al., "World Wide Web Caching: Trends and Techniques," XP-000949799, IEEE Communications Magazine, May 2000, pp. 178-185.

PCT/US 02-00886 Search Report, 6 pages, Oct. 2000.

PCT/US 02-00886 Search Report, 10 pages, Mar. 27, 2003.

Inohara, et al., "Self-Organizing Cooperative WWW Caching," © 1998 *IEEE* (pp. 74-83).

Zhang, et al., "Adaptive Web Caching," *Proceedings of the 1997 NLANR Web Cache Workshop*, Apr. 25, 1997 (9 pages).

Michel, et al., "Adaptive Web Caching: Towards a New Global Caching Architecture," © 1998 *Elsevier Science B.V.*, Computer Networks and ISDN Systems 30 (1998) (pp. 2169-2177).

Karger, et al., "Web Caching with Consistent Hashing," © 1999 *Elsevier Science B.V.*, Computer Networks 31 (1999)(pp. 1203-1213).

* cited by examiner

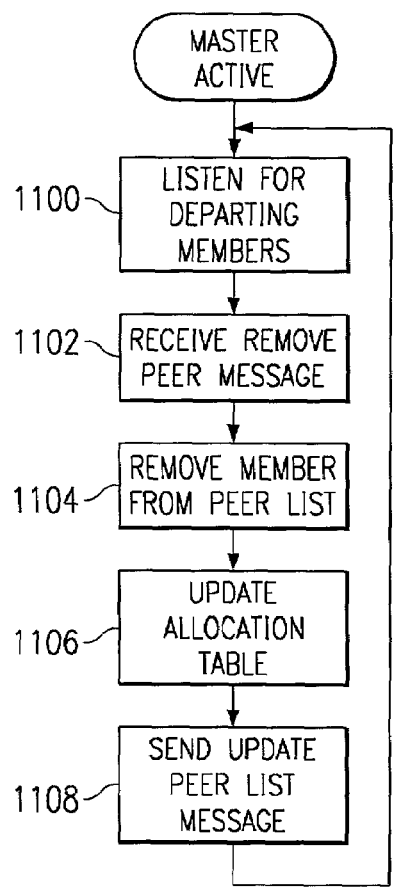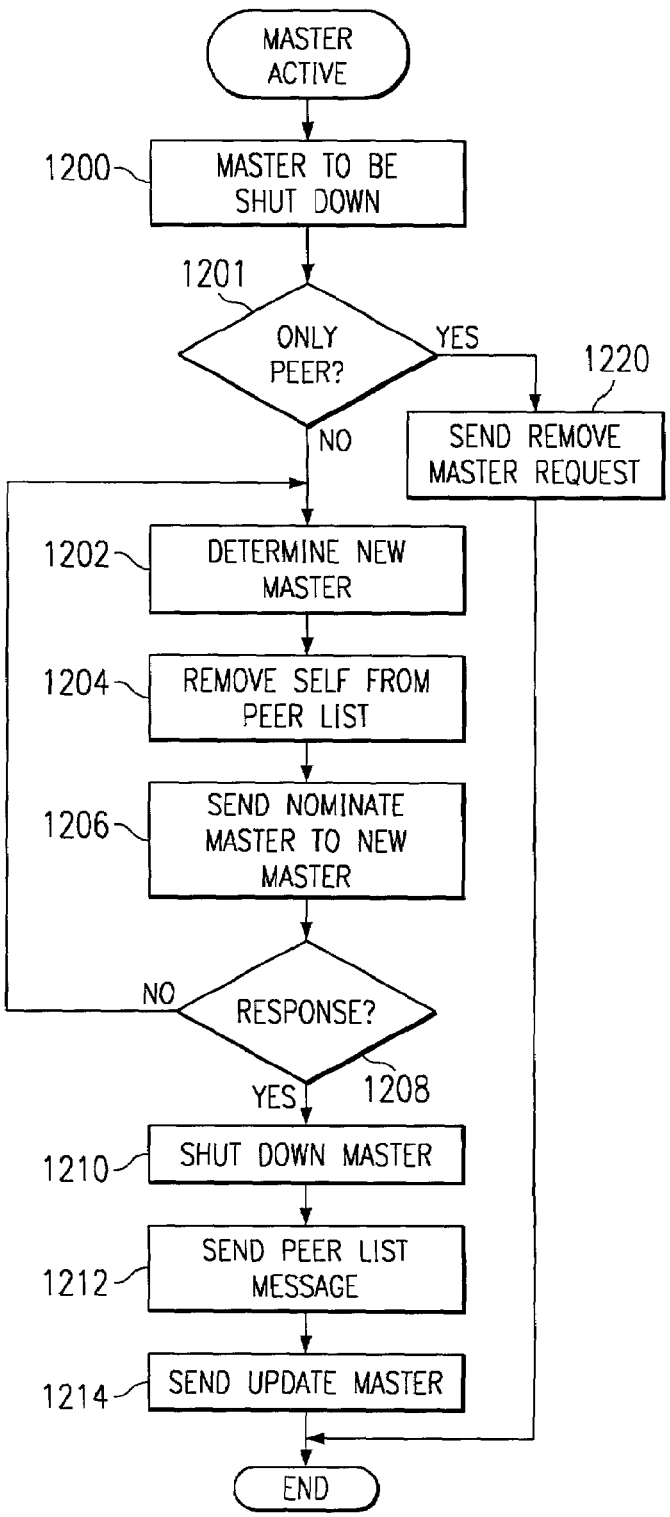

METHOD AND SYSTEM FOR DYNAMIC DISTRIBUTED DATA CACHING

TECHNICAL FIELD OF THE INVENTION

This invention relates in general to the field of data processing systems and, more particularly, to a method and system for dynamic distributed data caching.

BACKGROUND OF THE INVENTION

As computers have grown increasingly important in today's society, the importance of the Internet has also increased. As increasing numbers of users access the Internet, the need for efficient use of bandwidth has also increased. The increasing numbers of requests handled by the Internet are increasing the delay experienced by a user between generating a request and receiving a response to the request because of bandwidth limitations.

One traditional solution to decreasing bandwidth usage and decreasing the delay experienced by the user has involved caching previously requested content at the user's computer for faster retrieval. A related traditional solution has involved caching previously requested content for multiple users at a single cache server. Another traditional solution has involved increasing the bandwidth of the network connection between the Internet, the user and the web servers handling the requests. However, traditional solutions have often failed as the number of requests continue to increase and overload single cache servers and because of the expense associated with maintaining large numbers of high speed connections to the Internet. In addition, the traditional solutions have not utilized the "always-on" nature of newer broadband connections such as digital subscriber line and cable modems.

SUMMARY OF THE INVENTION

From the foregoing, it may be appreciated that a need has arisen for a method and system for dynamic distributed data caching to provide more efficient use of bandwidth.

According to one embodiment of the present invention, a method for dynamic distributed data caching is provided. The method comprises providing a cache community comprising at least one peer. Each peer has an associated first content portion indicating content to be cached by the respective peer. The method further comprises allowing a client to join the cache community, updating a peer list associated with the cache community to include the client, the peer list indicating the peers in the cache community, and associating a respective second content portion with each peer based on the addition of the client. The second content portion is distinct from the first content portion.

According to another embodiment of the present invention, a system for dynamic distributed data caching is presented. The system comprises logic encoded on storage. The logic is operable to provide a cache community comprising at least one peer. Each peer has an associated first content portion indicating content to be cached by the respective peer and allow a client to join the cache community. The logic is further operable to update a peer list associated with the cache community to include the client. The peer list indicates the peers in the cache community. The logic is further operable to associate a respective second content portion with each peer based on the addition of the client. The second content portion is distinct from the first content portion.

According to a further embodiment of the present invention, a method for dynamic distributed data caching is presented. The method comprises determining that a first master associated with a cache community is non-operational, electing a second master to replace the first master in the cache community, and allocating at least one content portion based on the loss of the first master.

According to a yet another embodiment of the present invention, a system for dynamic distributed data caching is presented. The system comprises logic encoded on storage. The logic is operable to determine that a first master associated with a cache community is non-operational, elect a second master to replace the first master in the cache community, and allocate at least one content portion based on the loss of the first master.

According to yet a further embodiment of the present invention, a method for dynamic distributed caching is presented. The method comprises requesting a list of cache communities from a cache server and determining whether at least one existing cache community exists. The method further comprises attempting to join a one of the existing cache communities when the existing cache communities are found and generating a new cache community when no existing cache communities are found.

According to another embodiment of the present invention, a system for dynamic distributed caching is presented. The system comprises logic encoded on storage. The logic is operable to request a list of cache communities from a cache server and determine whether at least one existing cache community exists. The logic is further operable to attempt to join a one of the existing cache communities when the existing cache communities are found and generate a new cache community when no existing cache communities are found.

According to a further embodiment of the present invention, a method for dynamic distributed data caching is presented. The method comprises generating a content request for requested content at a first peer in a cache community, determining a second peer associated with the requested content, the second peer being associated with the cache community, and retrieving, by the first peer, the requested content from the second peer.

According to yet another embodiment of the present invention, a system for dynamic distributed data caching is presented. The system comprises logic encoded on storage. The logic is operable to generate a content request for requested content at a first peer in a cache community, determine a second peer associated with the requested content, the second peer being associated with the cache community, and retrieve, by the first peer, the requested content from the second peer.

According to yet a further embodiment of the present invention, a method for dynamic distributed data caching is presented. The method comprises communicating a community request from a dynamic cache module to an administration module and receiving a community list from the administration module in response to the community request, the community list including a list of communities. The method further comprises generating a join request to attempt to join a one of the communities in the community list and receiving an allow message associated with the one of the communities. The method further comprises receiving a peer list associated with the one of the communities, receiving a content request, and storing content associated with the content request.

According to an additional embodiment of the present invention, a system for dynamic distributed data caching is presented. The system comprises logic encoded on storage. The logic is operable to communicate a community request from a dynamic cache module to an administration module and receive a community list from the administration module in response to the community request. The community list includes a list of communities. The logic is further operable to generate a join request to attempt to join a one of the communities in the community list and receive an allow message associated with the one of the communities. The logic is further operable to receive a peer list associated with the one of the communities, receive a content request, and store content associated with the content request.

According to a further additional embodiment of the present invention, a system for dynamic distributed data caching is presented. The system comprises means for providing a cache community comprising at least one peer. Each peer has an associated first content portion indicating content to be cached by the respective peer. The system further comprises means for allowing a client to join the cache community and means for updating a peer list associated with the cache community to include the client. The peer list indicates the peers in the cache community. The system further comprises means for associating a respective second content portion with each peer based on the addition of the client. The second content portion is distinct from the first content portion.

According to yet a further additional embodiment of the present invention, a system for dynamic distributed data caching is presented. The system comprises means for determining that a first master associated with a cache community is non-operational, means for electing a second master to replace the first master in the cache community, and means for allocating at least one content portion based on the loss of the first master.

According to yet another further additional embodiment of the present invention, a system for dynamic distributed caching is presented. The system comprises means for requesting a list of cache communities from a cache server and means for determining whether at least one existing cache community exists. The system further comprises means for attempting to join a one of the existing cache communities when the existing cache communities are found and means for generating a new cache community when no existing cache communities are found. According to another additional embodiment of the present invention, a system for dynamic distributed data caching is presented. The system comprises means for generating a content request for requested content at a first peer in a cache community and means for determining a second peer associated with the requested content. The second peer is associated with the cache community. The system further comprises means for retrieving, by the first peer, the requested content from the second peer.

According to yet a further additional embodiment of the present invention, a system for dynamic distributed data caching is presented. The system comprises means for communicating a community request from a dynamic cache module to an administration module and means for receiving a community list from the administration module in response to the community request. The community list includes a list of communities. The system further comprises means for generating a join request to attempt to join a one of the communities in the community list and means for receiving an allow message associated with the one of the communities. The system further comprises means for receiving a peer list associated with the one of the communities, means for receiving a content request, and means for storing content associated with the content request.

The present invention provides a number of technical advantages. Various embodiments of the present invention may provide all, some or none of these advantages. One such technical advantage is the capability to support a dynamic distributed caching system. In addition, the distributed caching system is supportable without the use of specialized hardware as standard personal computers may be used to support the distributed caching system. A further technical advantage is decreased utilization of expensive connections to the Internet and increased utilization of cheaper local area network connections and broadband connections, such as digital subscriber line and cable modems. By caching content at local machines on a local area network or on broadband connections to an Internet Service Provider, response time to requests for content is decreased by retrieving the content from local machines. Additional benefits may be realized by allowing more client machines to utilize a single connection to the Internet by decreasing the amount of bandwidth needed by particular client machines.

Another technical advantage is the capability to dynamically add and remove members from a distributed cache community. In contrast to traditional distributed caching systems, which have typically required a human administrator to add and remove members from the distributed caching system, the present invention provides the capability to dynamically add and remove members from the distributed cache community. Also, members may be added or removed from the cache community without the intervention of a human administrator. The present invention also reallocates the data to be cached by particular members of the distributed cache community based on the addition and subtraction of members to the distributed cache community.

BRIEF DESCRIPTION OF THE DRAWINGS

A better understanding of the present invention will be realized from the detailed description that follows, taken in conjunction with the accompanying drawings, in which:

FIG. 12 is a flow chart illustrating a method for gracefully removing the member from the cache community according to one embodiment of the present invention;

FIG. 13 is a flow chart illustrating a method for gracefully removing a master from the cache community according to one embodiment of the present invention.

DETAILED DESCRIPTION OF THE INVENTION

Figure 1:
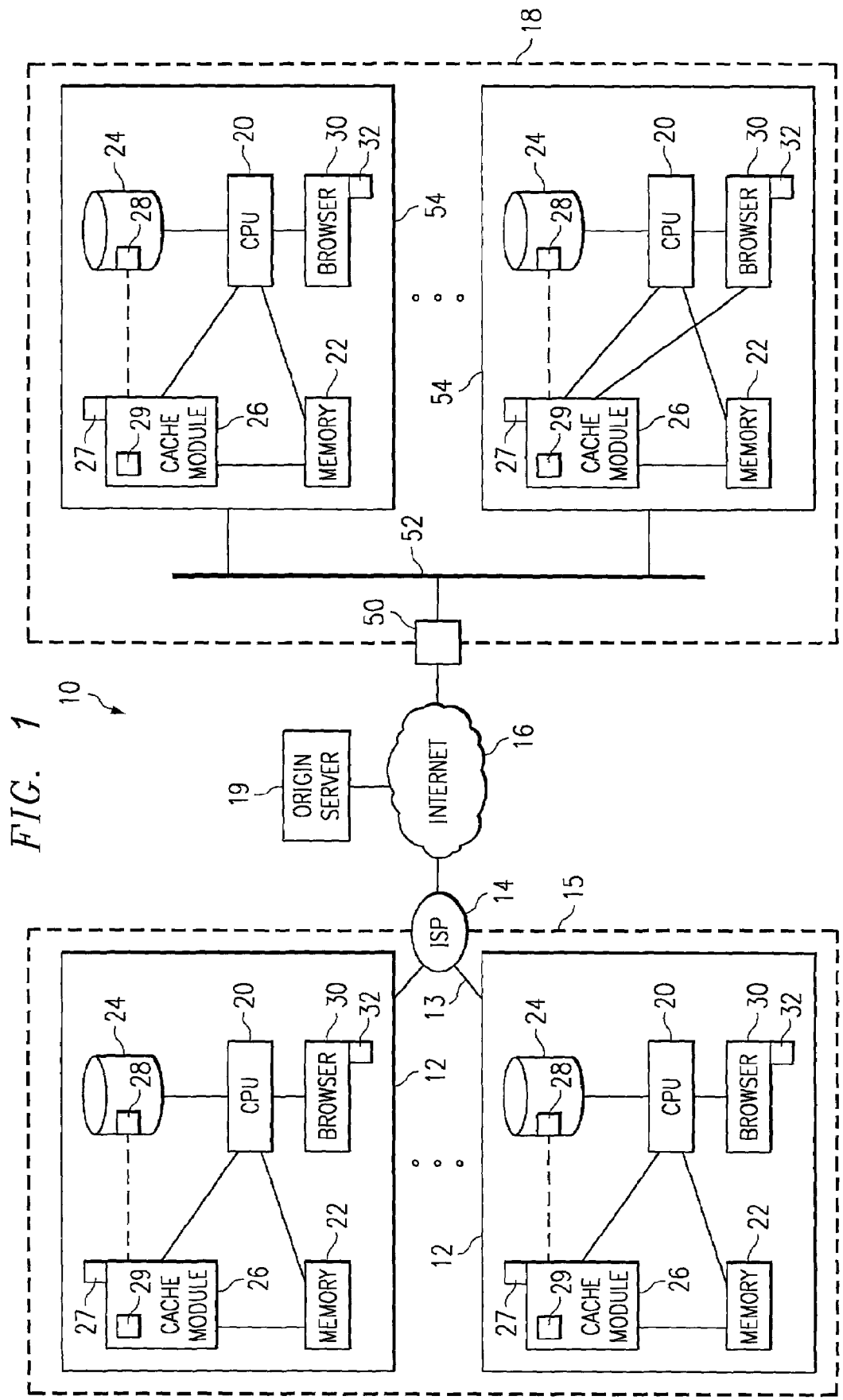
FIG. 1 is a block diagram illustrating a community cache system.

FIG. 1 is a block diagram illustrating a community cache system 10. System 10 comprises one or more Internet Service Provider (ISP) clients 12, an ISP 14, an ISP caching community 15, a network 16, an Intranet caching community 18 and an origin server 19.

Client 12 comprises a processor 20, a computer readable memory 22, a computer readable storage device 24, a cache module 26 and a browser 30. Client 12 may be adapted to execute any of the well-known MS-DOS, PC-DOS, OS/2, UNIX, Linux, MAC-OS, mainframe, minicomputer and Windows operating systems or other operating systems. Processor 20 comprises any suitable general purpose or specialized electronic processing device, such as a central processing unit (CPU), operable to communicate with memory 22 and storage device 24, and further to execute cache module 26 and browser 30. Memory 22 comprises any suitable combination of transient or persistent memory operable to store cache module 26 and browser 30, and to communicate with processor 20. Storage device 24 comprises any suitable combination of optical, magnetic or other computer readable storage medium such as a floppy disk drive, a hard disk drive, a CD-ROM drive, a CD-RW drive, a magnetic tape drive or an optical drive. Storage device 24 may also represent multiple computer readable storage devices. Storage device 24 includes a cache portion 28.

Cache portion 28 comprises a portion of storage device 24 used by cache module 26 for caching data. Access to cache portion 28 may be controlled by cache module 26 so as to prevent user modification of data stored in cache portion 28. Cache portion 28 may comprise one or more directories, one or more logical partitions, one or more distinct physical devices and other suitable physical and logical elements.

Cache module 26 comprises a software application operable to manage cache portion 28 of storage device 24. Cache module 26 is operable to monitor the activities of browser 30 and to cache content items retrieved by browser 30. Cache module 26 is also operable to respond to content requests from browser 30 using content cached in cache portions 28 at clients 12 in community 15. In one embodiment, cache module 26 may use the Cache Array Routing Protocol (CARP) to determining the location of content within community 15. Cache module 26 is configurable such that limits may be placed on the size of cache portion 28 and the amount of processor time used on processor 20 by cache module 26. For example, a user associated with a client 12 may configure the cache module 26 associated with that client 12 to use only 5% of the storage space and no more than 10% of the processor time. For another example, a user associated with a client 12 may configure the cache module 26 associated with that client 12 to only provide caching services when the system is idle, such as when a screen saver is active or when processor usage by the user of the client 12 is below a particular threshold. In general, resource limits may be associated with cache module 26 such that cache module 26 is prevented from consuming more than a predetermined amount of the resource. The resources may comprise any of an amount of processor time on processor 20, an amount of bandwidth on link 13, an amount of storage space on storage 24, an amount of memory 22 and other computing resources associated with client 12. Cache module 26 is further operable to collect statistical information associated with link 13, browser 30, client 12, portion 28, cache module 26 and other elements in community 15.

Cache module 26 is further operable to encrypt data stored in cache portion 28. Cache module 26 may use any suitable symmetric and/or asymmetric encryption system for encrypting data in cache portion 28. For example, cache module 26 may use public-key/private-key encryption, the U.S. Data Encryption Standard (DES), the Twofish algorithm, the Blowfish algorithm and other suitable encryption systems. Encrypting data stored in cache portion 28 prevents a user associated with client 12 from unrestrictedly accessing and modifying cached content. Encryption also provides privacy as the user of any particular client 12 in community 15 is prevented from viewing the data retrieved by other users in community 15.

The increasing use of "always-on" Internet connections with large bandwidth capacities allows for the use of a distributed caching system using non-specialized equipment. Note that as used herein, an "always-on" connection is defined as a data connection between a client computer, such as a personal computer, and a network, such as the Internet, which operates without competing with other devices associated with a user of the client computer. In addition, an "always-on" connection as used herein may be off and may cycle between being on and off at unpredictable intervals. Stated another way, an "always-on" connection has the capability to be continuously active without interfering with other devices usable by the user associated with the client computer, but the "always-on" connection is not required to be literally "always-on". For example, a traditional analog modem is typically active only when a user of the modem explicitly activates the analog modem and prevents the use of the phone line by the user of the analog modem for voice communication when the analog modem is active. Typically, an analog modem is not considered as creating an "always-on" connection. For another example, a digital subscriber line (DSL) modem, a cable modem and a local area network (LAN) have the capability to be continuously active without interfering with the use of the phone line or the cable television while active. Typically, a DSL modem, a cable modem and a LAN would be considered as creating "always-on" connection.

The growing availability of "always-on" connections provides the opportunity to utilize the processing power and storage capacity of computers connected via "always-on" connections to the Internet or other networks. Many computers with "always-on" connections utilize only a small portion of their processing power and storage space. For example, many DSL and cable modem connected personal computers remain completely unused during the day when their owner is at work and this unused processing and storage capacity may be used to form a distributed caching system. In addition, even when being used, many computers with "always-on" connections may have significant unused storage and processing capability. System 10 provides the capability to harness the unused processing power and storage capacity of standard computers to create a distributed caching system.

In return for the use of processing power and storage capacity on computers to form the distributed caching system, a provider of system 10 may provide incentives to the users of clients 12. For example, an ISP, such as 14, may deploy cache modules 26 to subscribers of the ISP in return for a lower subscription cost. For another example, an ISP could use system 10 as part of a value-added service of faster internet service.

Each cache module 26 is further operable to generate a cache status message 27. Cache status message 27 comprises a indication of whether a particular cache module 26 is active or inactive. More specifically, cache status message 27 includes a "cache on" or a "cache off" indication. The "cache on" indication indicates that the associated cache module 26 has gone from an inactive to an active state and is requesting to join community 15. The "cache off" indication indicates that the associated cache module 26 is going from an active to an inactive state and is requesting removal from community 15. Cache status message 27 may also include an "active" indication. The active indication indicates that the associated cache module 26 is currently active, and caching content and handling requests for content from browsers 30. The active indication may operate as a heartbeat indicating that the associated cache module 26 is alive.

Each cache module 26 further comprises a distinct location table 29. Location table 29 comprises one or more indications of the location within community 15 of cached content. More specifically, location table 29 indicates which client 12 is responsible for caching which content. In general, table 29 may use any suitable indication for indicating which clients 12 to cache content at, such as IP addresses, domain names, portions of URLs or a hash value based on a content request from browser 30.

Cache modules 26 may be further operable to provide increased anonymity while surfing to users of clients 12. More specifically, cache module 26 may remove specific lines in HTTP requests, such as requests 32, sent to retrieve web pages from origin server 19. This feature assists in preventing the sending of certain personal information to origin servers 19. For example, browser 30 typically requests a web page from origin server 19 by generating a request 32. Request 32 may include a header portion that may include information about client 12 and the associated user, such as an email address and what web sites that the user has visited. Cache module 26 may intercept request 32 and remove parts of the header portion which are not required to retrieve web pages. In one embodiment, cache module 26 comprises a Microsoft Windows application. The cache module 26 is operable to collect statistics such as the number of cache hits, the number of requests received by cache module 26, the hit percentage, the amount of data cached, the maximum capacity of cache portion 28, and how long cache module 26 has been active. Cache module 26 may also allow a user to configure various aspects of cache module 26, such as the size of cache portion 28, enable or disable anonymous surfing and purge cache portion 28.

Browser 30 executes on client 12 and comprises any suitable Hypertext Transport Protocol (HTTP) client. In the disclosed embodiment, browser 30 comprises a web browser such as Internet Explorer® by Microsoft Corp. of Redmond, Washington, or Netscape Communicator by Netscape Communications Corp. Browser 30 is held in memory 22 and executed by processor 20. Browser 30 transmits and receives data over link 13. Each browser 30 is operable to generate one or more content requests 32. Each request 32 is generated by a particular browser 30 in response to a desire for information by a user (not shown) associated with that particular browser 30. Each request 32 comprises a request for one item of content from origin server 19. In the disclosed embodiment, request 32 comprises an HTTP request. The HTTP request comprises a Uniform Resource Locator (URL) portion identifying the requested item of content and a header portion containing further information about the HTTP request. The requested item of content may further comprise multiple elements of content, for example, a web page with multiple graphic elements therein, but the request is directed to retrieving the single content item associated with the URL while the remaining elements of content in the main content item are retrieved as a function of the single content item.

Content comprises static information and dynamic information. Static information typically does not change once the content has been created or does not change except slowly over time. Stated another way, static information comprises content that, when created, is expected to remain the same for an indeterminate amount of time. Static information may comprise, for example, text files and preexisting Hypertext Markup Language (HTML) web pages. For example, a restaurant menu is the same regardless of the user who is accessing the menu because the menu is the same for all people. However, as chefs at the restaurant change over time, the menu may also change.

In contrast, dynamic information comprises content that is expected and designed to change. The dynamic content may change based on the data and criteria used for generating the dynamic content, such as a search result page. For example, a search for "mountain lions" will dynamically generate a search result page listing items related to "mountain lions." The dynamic content may also change based on information associated with the page, for example, a page in an online product catalog may change in response to pricing and availability changes, and dynamic content may further change for other suitable reasons. Dynamic information may comprise, for example, the output of Common Gateway Interface (CGI) scripts, search engine results, the output of Structured Query Language (SQL) searches and the SQL search itself, JavaScript, the output of JavaScript scripts, ActiveX controls and the output of ActiveX controls, Active Server Pages, applets and any other suitable dynamic content generation system. Often, the dynamic information will be expressed as a single HTML web page, but the information within the HTML web page has been generated dynamically based on some suitable criteria. For example, the result of a search using a search engine on the Internet returns different information based on the search terms provided by the user. The search results may also depend on one or more attributes associated with the search request, such as geographic location or the current date. Continuing the search engine example, when the user is searching for local businesses, the search results will vary not only on the search terms provided by the user, but also what "local" means with respect to the search request. For another example, a user searching for information about current events will want results that are tailored to the user's search terms, the user's location, and the current date. For yet another example, an online book retailer may provide price information and consumer reviews of books available from the online book retailer. The price information for a particular book may change unexpectedly in response to a sale or a sudden interest in that particular book. Also, the web page listing the book and the consumer reviews changes in response to a consumer entering a new review of the book.

Referring again to FIG. 1, communications link 13 comprises a data communications link operable to communicate data between clients 12 and ISP 14. In the disclosed embodiment, link 13 comprises an "always-on" type connection, such as digital subscriber line (DSL) or a cable modem.

ISP 14 comprises a point of presence on network 16 for communicating data from clients 12 to remote locations. ISP 14 may also define the boundary of community 15.

Community 15 comprises a plurality of clients 12 at whom content items retrieved by browsers 30 may be cached in cache portions 28. Community 15 represents a group of clients 12 which cooperate to form a distributed caching system using cache module 26 and portion 28. Requests by browsers 30 within community 15 for content cached within community 15 do not need to be propagated over network 16 since the requested content is available within community 15.

Network 16 comprises any suitable data transport network, such as a Transmission Control Protocol/Internet Protocol (TCP/IP) network, an asynchronous transfer mode (ATM) network, an Ethernet network, or a frame-relay network. In the disclosed embodiment, network 16 comprises the Internet.

Community 18 represents an exemplary cache community based around a corporate Intranet. The distributed caching capabilities of system 10 are not limited to home computers. A corporation may utilize cache modules 26 in order to improve web performance for the corporation's employees and/or to decrease the amount of Internet connectivity the corporation purchases. The 10 megabit, 100 megabit, gigabit and faster LAN technologies used by corporations are well suited to the distributed cache of system 10. LAN technologies may be considered as providing an "always-on" connection within the scope of the present invention. Other collections of computers may also form cache communities, communities 15 and 18 represent two examples of possible cache communities.

Community 18 may comprise a corporate intranet having a communications interface 50, a LAN 52 and a plurality of intranet clients 54. Interface 50 comprises a communication interface between LAN 52 and Internet 16. For example, interface 50 may comprise a firewall, a router or other suitable communications interfaces. Interface 50 may also define the boundary of community 18. LAN 52 comprises any suitable local area network, such as Ethernet, ATM, or TCP/IP. Intranet clients 54 are similar to ISP clients 12 except that clients 54 are members of an Intranet. Community 18 operates similarly to community 15, except as otherwise noted.

Origin server 19 communicates data over network 16. Origin server 19 comprises any suitable hardware and/or software executing on a computer for receiving and responding to requests 32. Origin server 19 may comprise a single computer executing software or may comprise a plurality of computers each executing software. In the disclosed embodiment, origin server 19 comprises an HTTP server which may also be known as a web server. Origin server 19 may additionally support other protocols such as the file transfer protocol (FTP). Origin server 19 retrieves information from one or more data sources (not shown), such as a storage device coupled to server 19 or other origin servers, in response to requests 32. Origin server 19 is operable to retrieve static content, such as prewritten text files, images, and web pages, from the data source in response to requests 32. Origin server 19 is also operable to generate new, dynamic content, for example, by dynamically creating web pages based on content stored in the data source in response to requests 32. For example, origin server 19 may generate a new web page using a common gateway interface (CGI) script, generate a new web page from the result of a structured query language (SQL) request and perform other suitable content generation functions. Origin server 19 may also be operable to generate executable software, such as applications and applets, in response to requests for data. For example, origin server 19 may generate a Java applet in response to an appropriate request 32.

In operation, browser 30 generates request 32 for content. Operation of system 10 will be described with respected to cache community 15, however, it should be noted that cache community 18 operates similarly using clients 54. Cache module 26 then intercepts request 32 before request 32 is communicated to network 16. Cache module 26 examines request 32 to determine whether the requested content is available in community 15. If the requested content is available in community 15, cache module 26 retrieves the requested content from the appropriate storage portion 28 within community 15 and returns the requested information to the browser 30 which requested it. If the requested content is not available within community 15, then cache module 26 forwards request 32 over link 13 to ISP 14 for normal handling. Similarly, a request 32 generated by a browser on a client 54 is intercepted by cache module 26 to determine whether the requested content is available within community 18.

Cache module 26 may be configured to control the amount of processor power, storage space and bandwidth of a particular client 12 used by community 15. The client-by-client control of usage available to clients 12 allows for individual tailoring of community 15 to particular clients 12. The client-by-client control of usage also allows for different incentive plans for subscribers if ISP 14. For example, a subscriber to ISP 14 may have a second computer separate from the computer normally used by the subscriber. The subscriber with two computers could dedicate a large percentage of processor 20 and storage 24 to community 15 in exchange for ISP 14 providing a second IP address for the second computer over a DSL type link 13 for free. For another example, a subscriber of ISP 14 may dedicate increasing proportions of the bandwidth available over link 13 in return for decreasing subscription costs, such as 40% for a 40% discount or 50% for a 50% discount. Community 18, representing a corporate intranet, may allow for centralized control of the percentage of the processing power, storage and bandwidth used by community 18, such as by a corporate information technology (IT) department.

In one embodiment, cache module 26 may cache content using a conservative mode or an aggressive mode. When in the conservative mode, cache module 26 caches content received by browser 30 which is marked as cacheable. When in the aggressive mode, cache module 26 caches all content unless the content has been explicitly marked as non-cacheable. In general, by caching all content, unless the content is listed as non-cacheable, more content may be cached in comparison to conservative mode caching. Cache modules 26 using aggressive mode caching may further include communicating with a data center. More specifically, cache module 26 may communicate with the data center to inform the data center of data cached by cache module 26.

Aggressive mode caching may use a content expiration protocol to avoid providing expired, but cached, content. The data expiration protocol may use data expiration commands to inform cache modules 24 that data at an origin server 19 has changed. Alternatively, a single cache module within a community 15, such as the master node discussed below, may communicate with the data center. By informing the data center of data cached within community 15, the data center can send data expiration commands to community 15 so that cache modules 24 can mark cached content as expired.

The data expiration command comprises any suitable message for expiring data stored by cache module 24. In one embodiment, the data expiration command comprises an Internet Cache Synchronization Protocol (ICSP) message. The ICSP message may expire any of a single web page, a plurality of web pages at a single web site, a plurality of web pages at a plurality of web sites, a plurality of sites within a single domain and one or more specific objects on a web page, such as an image. For example, the ICSP message may expire a single web page such as http://www.domain.com/web_page.html. The ICSP message may expire a plurality of web_pages at a single web site such as http://www.domain.com/web_pages/* which would expire all web pages in the "web_pages" directory at the site www.domain.com. The ICSP message may expire a plurality of pages at a plurality of web sites such as http://*.domain.com/web_pages/* which would expire all web pages in the "web_pages" directory of each site in "domain.com". The ICSP message may expire a plurality of web sites such as http://*.domain.com which would expire all web pages on all sites in "domain.com". For another example, a single active server page (ASP) may result in many individual cached pages. A single ASP page may generate large numbers of individual cached pages because a single ASP page can dynamically create multiple different specific pages, such as http://www.domain.com/product_description.asp?category=_&product=_may specify an ASP page that generates many specific product description pages based on a specified category and product. To cache module 24, product_description.asp?category=5&product=7, product_description.asp?category=5&product=6 and product_description.asp?category=3&product=7 may specify three different cached pages. By expiring product_description.asp?category=*&product=7 ALL categories of product seven are expired, while not affecting product six related pages even though all of the pages were generated from a single ASP page.

In general, the data center may generate the data expiration command in response to a change in the content at origin server 19. The data center may also generate the data expiration command in response to the elapsing of a predetermined time period. ICSP supports the synchronization of cached content in community 15 with updated content available at origin server 19. Further details of ICSP are described in the patent application entitled "Method and Apparatus for Content Synchronization" by inventors Keith A. Lowery, et al., filed on Jun. 8, 2000, Ser. No. 09/590,760, which is incorporated herein by reference.

In addition, cache module 26 may provide a guaranteed click delivery capability. The guaranteed click delivery capability comprises the capability to regularly check whether a particular web page is available and to retrieve the web page when the web page becomes available. For example, a user of client 12 may attempt to retrieve a particular web page. The server providing that web page may be currently overloaded and unable to provide the requested web page. Cache module 26 may detect that the server is too busy, such as when the web site returns a "server too busy" error message, and then automatically attempt to retrieve the request web page from the busy server. For example, a busy server may comprise a server which is currently processing substantially all the requests 32 which the server is capable of handling. For another example, a busy server may comprise a server which is providing content and using substantially all of the bandwidth available to the server. In general, a busy server may comprise a server which is incapable of processing more requests 32 at a given time for one or more reasons. Cache module 26 may then display the retrieved web page in browser 30 or may abandon the attempt to retrieve the web page after a predetermined period of time has elapsed without successfully retrieving the requested web page. Cache module 26 may also ask the user whether the user wants cache module 26 to attempt to retrieve the requested web page from the busy server. Typically, cache module 26 would attempt to retrieve the requested web page from the busy server while the user retrieves and views other web pages from other origin servers 19. Stated another way, cache module 26 would attempt to retrieve the requested web page in the background while the user may also be performing other tasks.

Yet another capability of cache module 26 is the ability to provide a screen saver to a user associated with client 12. The screen saver displays a graphical representation of the user's response time to one or more origin servers 19. For example, the response time between client 12 and a particular web site may be displayed in a graphical manner. More specifically, the screen saver displays a solar system-like graph with client 12 generally in the center and the distance between client 12 and other web sites displayed based on the round-trip ping time between client 12 and the other web sites.

Figure 2:
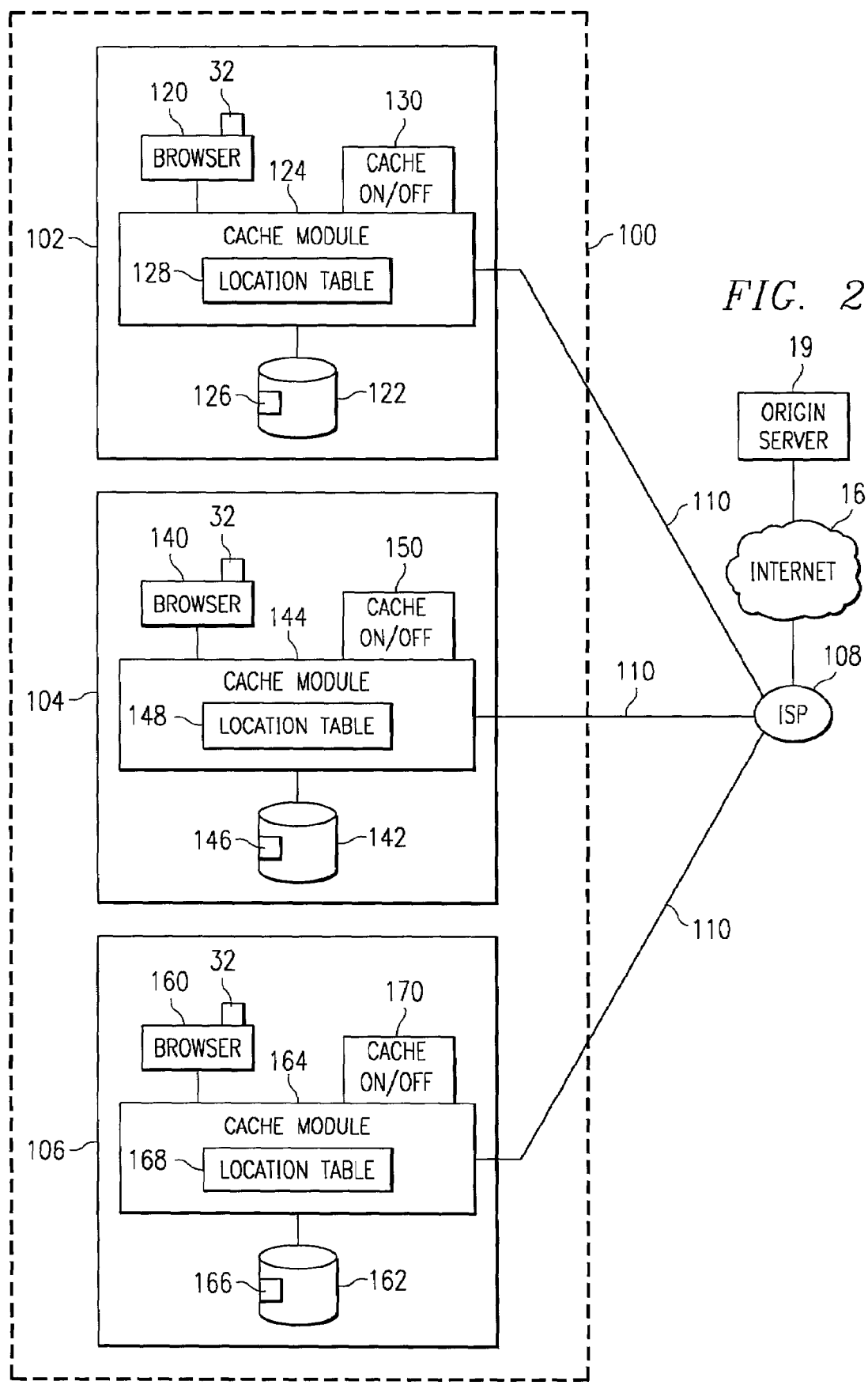
FIG. 2 is a block diagram illustrating an exemplary community cache constructed according to the teachings of the present invention.

FIG. 2 is a block diagram illustrating an exemplary community cache 100. Community 100 comprises a first client 102, a second client 104, a third client 106 and an ISP 108. In the exemplary embodiment of FIG. 2, clients 102, 104 and 106 represent specific examples of clients 12 of FIG. 1. Clients 102, 104 and 106 communicate with ISP 108 over respective communication links 110. Client 102 comprises a browser 120, storage 122, and a cache module 124. Client 104 comprises a browser 140, storage 142, and a cache module 144. Client 106 comprises a browser 160, storage 162, and a cache module 164.

Browsers 120, 140 and 160 represent distinct examples of browsers 30 of FIG. 1. Each of storage 122, 142, and 162 respectively support cache portions 126, 146, and 166. Storage 122, 142, and 162 represent distinct examples of storage 24 of FIG. 1. Cache portions 126, 146, and 166 represent distinct examples of cache portions 28 of FIG. 1. Cache modules 124, 144, and 164 support respective location tables 128, 148 and 168. Each of cache module 124, 144 and 164 are operable to generate respective cache status messages 130, 150 and 170. Cache modules 124, 144, and 164 represent distinct examples of cache modules 26 of FIG. 1. Location tables 128, 148 and 168 represent distinct examples of location table 29 of FIG. 1. Cache status messages 130, 150 and 170 represent distinct examples of cache status message 27 of FIG. 1.

Location tables 128, 148, and 168 respectively comprise one or more indications of which client 102, 104 or 106 to cache content in response to requests 32 from browsers 120, 140, and 160. For example, location table 128 may indicate that content identified by URLs having a domain name beginning with A–D is cached at client 102, while domain names E–H are cached at client 104 and domain names H–Z are cached at client 106. For another example, location tables 128, 148 and 168 may indicate particular ranges of IP addresses to be cached at particular clients 102, 104 and 106. In general, tables 128, 148 and 168 may use any suitable indication for indicating which clients 102, 104 and 106 to cache content at, such as IP addresses, domain names, portions of URLs or a hash value based on request 32.

Cache status messages 130, 150 and 170 each comprise a message respectively generated by modules 124, 144 and 164 to indicate to other modules 124, 144 and 164 that the generating module is activating or deactivating its caching functionality. For example, when cache module 124 at client 102 is activated it may generate a cache status message 130 indicating caching is active at client 102.

Communications link 110 comprises any suitable data communications system. In the exemplary embodiment of FIG. 3, communications link 110 comprises a "always-on" link, such as DSL or a cable modem, similar to link 13 in FIG. 1. ISP 108 comprises an Internet service provider operable to communicate data between clients 102, 104 and 106 and network 16 similar to ISP 14 of FIG. 1.

In operation, in one embodiment, community 100 may be formed by dynamically seeking out other active instances of cache module 26. Then, based on a set of performance heuristics, clients 12 are bonded together under favorable conditions. Cache module 26 may use dynamic affiliation algorithms to build and manage communities 100. More specifically, on startup, cache module 26 may communicate with a remote directory provider for assistance in finding other cache modules 26 with which to form a community 100. Using the assistance from the remote directory provider, the client may attempt to contact and possibly join a currently existing community 100. If no communities 100 are found or found communities 100 do not allow cache module 26, then cache module 26 may attempt to start its own cache community. Alternatively, if no remote directory is available, cache module 26 searches for communities 100 itself. For example, cache module 26 may send a broadcast and/or a multicast message looking for communities 100.

Each community 100 includes a master node and, optionally, one or more normal nodes. A master node comprises a cache module 26 on a particular client 12 which is responsible for supervising the addition and departure of clients from community 100. The master node receives data associated with the addition of a client 12 to community 100 and the departure of a client 12 from community 100 and communicates the data to the other members of community 100. Any cache module 26 may function as the master node. Any suitable method for electing the master node may be used by cache modules 26. For example, a cache module 26 which has been activated the longest may be selected as the master, with ties being resolved randomly. The departure of the master node causes the election of a new master node by the remaining members of community 100.

Community 100 handles the graceful and non-graceful departure of clients 12 from community 100. A graceful departure comprises an intentional departure of a client 12 from community 100. For example, a graceful departure may occur when a user deactivates cache module 26. A non-graceful departure comprises an unexpected departure of a client 12 from community 100. For example, a non-graceful departure may occur when a client 12 suddenly crashes and ceases operation. When an active cache module 26 shuts down, for example, the cache module 26 requests to leave community 100 and the request circulates through the remaining community members. The remaining community members would then discontinue forwarding requests to that client 12. In a non-graceful scenario, a managing peer (known as a Master) watches for dead peers and notifies the rest of a community if this condition is detected.

Similarly, the managing peer may depart gracefully or non-gracefully. A graceful departure of the managing peer comprises the managing peer informing community 100 that the managing peer is leaving community 100. An election is then held by the remaining members of the peer to select the new managing peer. When a non-graceful departure occurs, such as when the managing peer crashes, a cache module 26 may detect that the managing peer is not responding and call an election to create a new managing peer. In general, any suitable techniques may be used to handle the arrival and departure of cache modules 26 from community 100, and to create and maintain the managing peer.

Figure 3:
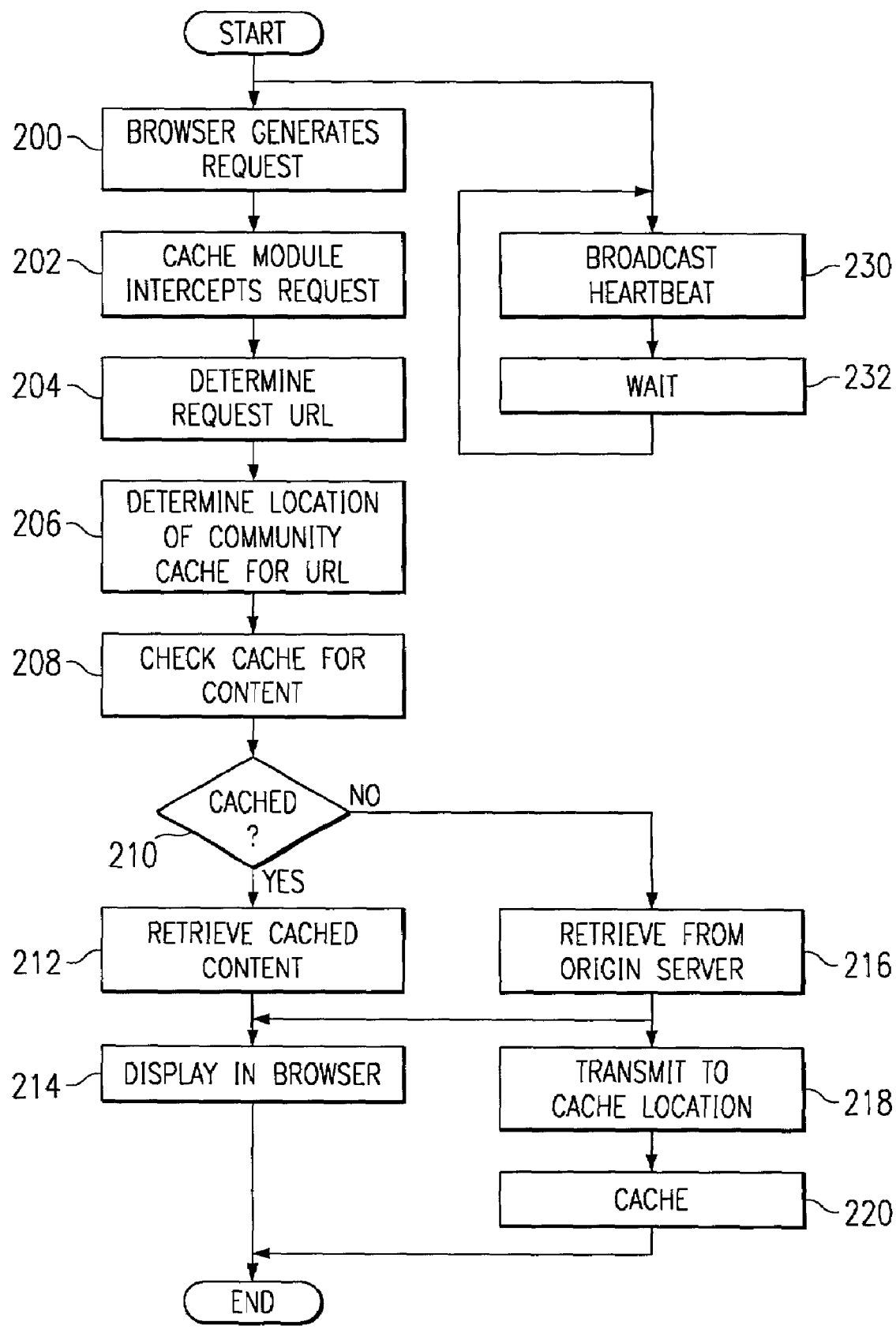
FIG. 3 is a flowchart illustrating a method for community caching according to the teachings of the present invention.

FIG. 3 is a flowchart illustrating a method for community caching. For increased clarity, the operation of the exemplary cache community 100 of FIG. 2 will be described in association with FIG. 3. The method begins at step 200 where browser 120 generates a request 32 for content. The URL portion of the request 32 identifies the requested content as "http://www.server.com/jobs/listing.html". Next, at step 202 module 124 intercepts request 32 generated by browser 120. Then, at step 204, cache module 128 determines the URL associated with request 32.

Proceeding to step 206, cache module 124 determines the location where the content associated with the URL associated with request 32 would be cached. More specifically, cache module 124 determines which of the storage portions 126, 146 or 166, would store the requested content based on information in location table 128. In the example of FIG. 2, location table 128 indicates that the domain "server.com" would be cached at client 106. Next, at step 208, cache module 124 checks storage portion 166 for the requested content and at decisional step 210, determines whether the requested content has been cached. More specifically, cache module 124 queries cache module 164 to determine whether the content associated with the URL in request 32 has been cached in portion 166 at client 106. If cache module 164 replies that the requested content is cached in portion 166, then the YES branch of decisional step 210 is followed to step 212 where the requested content is retrieved from storage portion 166 and, at step 214, is displayed at browser 120.

If the requested content is not cached at portion 166, indicating that the requested content is not available within community 100, then the NO branch of decisional step 210 leads to step 216. At step 216, the requested content is retrieved from origin server 19 since the requested content is not cached within community 100. The requested content is then displayed on browser 120 at step 214 and, at step 218, a copy of the requested content is communicated to cache module 164 for storage in portion 166. Then, at step 220, the retrieved content is stored in portion 166 by module 164.

Returning to the start state of FIG. 3, steps 230 and 232 are typically performed in parallel to the processing previously described for FIG. 3. At step 230, modules 26 generate cache status messages 27 with an "active" indication and broadcast messages 27 to clients 12 (or 54) in community 15 (or 18). Message 27 with an "active" indication may be used by modules 26 to indicate that the associated cache module 26 is alive. Then, at step 232, modules 26 wait a predetermined period of time before broadcasting another message 27. Modules 26 wait so as not to flood community 15 (or 18) with messages 27 and waste bandwidth. In one embodiment, the predetermined wait period is five seconds. Modules 26 which fail to broadcast the "active" indication may be removed from the cache community because the associated cache module 26 may have failed, other suitable actions may be taken in response to a failure to broadcast the "active" indication.

The method described by FIG. 3 is shown to end after steps 214 and 220, this indicates that the processing for the request generated in step 200 has been completed. The method described by FIG. 3 is expected to be repeated a plurality of times within the scope of the invention.

Figure 4:
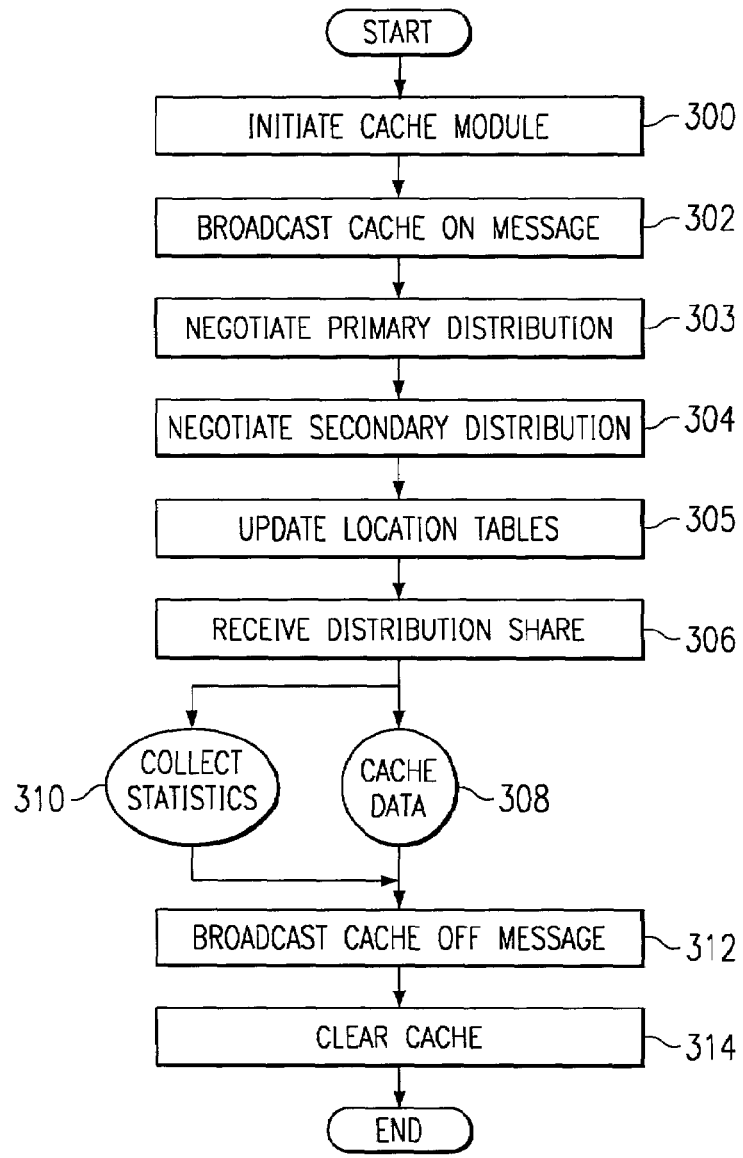
FIG. 4 is a flowchart illustrating a method for generating a community cache according to the teachings of the present invention.

FIG. 4 is a flowchart illustrating a method for generating a cache community, such as 15, 18 or 100. For increased clarity, the exemplary community 100 of FIG. 2 is discussed in association with FIG. 4. The method begins at step 300 where cache module 144 is initiated. Initiating module 144 may comprise activating module 144, such as by activating client 104. Next, at step 302, cache module 144 generates cache status message 150 with a "cache on" indication and broadcasts cache status message 150 to clients 102 and 106 in community 100. Message 150 may be broadcast using any suitable method supported by ISP 108 and links 110. For example, a TCP/IP broadcast or multicast message may be used to reach clients 102 and 106 associated with ISP 108. For another example and referring back to FIG. 1, community 18 may use an Ethernet broadcast message to reach all clients 54 in community 18.

At step 303, a primary distribution of portions of content to be cached ("cache shares") is negotiated between modules 124, 144 and 164 within community 100. The primary distribution of cache shares may be determined by splitting up URLs alphabetically by domain name, by generating a unique hash value for each URL and distributing the hash values among clients 102, 104 and 106, by IP address range or by any other suitable method or combination of methods. The distribution method to use may be configured for modules 124, 144 and 164, such as by an administrator. The actual primary distribution of cache shares may comprise a simple fractional split between the members of a cache community, such as 15, 18 (FIG. 1) or 100, or may also consider other elements. For example, the actual distribution may consider the speed of links 13 (FIG. 1) or 110, the processing power of processors 20 (FIG. 1) and/or the size of portions 28 (FIG. 1), 126, 146 and 166. Historical and statistical information may be considered when determining the primary distribution. For example, a particular client, such as 12 or 54, which regularly reboots may receive a smaller a cache share than a client which has a historically high up time.

With respect to the example in FIG. 2, modules 124 and 164 may have already negotiated cache shares based on an alphabetical distribution where URLs having domains starting with A–M are cached at client 102 and domains starting with N–Z are cached at client 106. Modules 124, 144 and 164 may now renegotiate cache shares such that A–H domains are cached at client 102, I–P domains are cached at client 104 and Q–Z domains are cached at client 106 using a simple fractional alphabetic distribution.

Proceeding to step 304, a secondary distribution may optionally be negotiated. For increased reliability, cache modules 26 may be configured to negotiate the secondary distribution. The secondary distribution represents a distribution of cache shares to decrease the impact of the failure of clients 12. The secondary distribution may be determined using any of the information and methods used in determining the primary distribution in step 303. For example, cache modules may negotiate a secondary distribution of cache shares such that multiple clients 12 are caching the same content so that if a particular client 12 fails, a backup of the cached content exists within the community.

Figure 5:
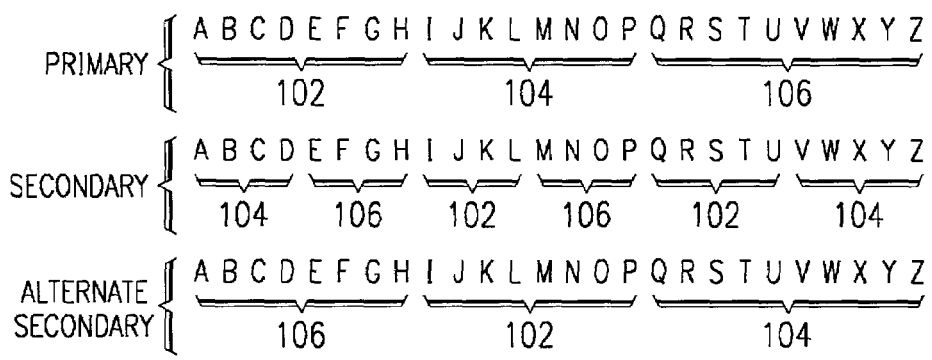
FIG. 5 is a diagram illustrating an exemplary distribution of cache shares according to the teachings of the present invention.

FIG. 5 is a diagram illustrating an exemplary distribution of cache shares. For increased clarity, FIG. 5 is discussed in association with FIGS. 2 and 4. The primary distribution of cache shares described previously in associated with step 303 is shown in FIG. 5 as "primary" where domains A–H were allocated to client 102, domains I–P were allocated to client 104 and domains Q–Z were allocated to client 106. An overlapping secondary distribution may be used to allocate portions of the primary distribution to other clients for increased reliability. For example, an overlapping secondary distribution may allocate I–L and Q–U to client 102, A–D and V–Z to client 104 and E–H and M–P to client 106 as shown in the "secondary" line of FIG. 5. Alternatively, the secondary distribution may simply rotate cache shares, such as having A–H allocated to client 106, I–P allocated to client 102 and Q–Z allocated to client 104 and is shown as "alt. secondary" in FIG. 5. Any suitable secondary distribution may be used depending on the configuration of cache modules 26 (FIG. 1), 124, 144 and 164 (FIG. 2). It should be noted that the cache shares shown in FIG. 5 are provided for increased clarity and are merely exemplary, various other primary and secondary distributions of cache shares are usable within the scope of the invention.

In addition, tertiary and further distributions may be negotiated to provide multiple layers of backup within cache communities 15, 18 and 100 at step 304. The determination of how many layers of backup to provide may be based on the reliability of clients 12, 54 (FIG. 1), 102, 104 and 106 (FIG. 2), the delay associated with checking backup cache modules 26 versus the delay associated with retrieving the data from origin server 19, bandwidth considerations with community 15, 18 or 100 and other criteria.

Then, at step 305, once the primary, secondary and other distributions are determined, location tables 128, 148 and 168 are updated to reflect which client 102, 104 and 106 is caching which content.

Then, at step 306, any redistribution of previously cached content for supporting a newly negotiated distribution occurs. Redistribution may comprise actually copying cached content from one client, such as 12 or 54 (FIG. 1), to another, or removing or expiring content no longer cached at a particular server. Simply removing the cached items may cause a request that could have been satisfied by the community cache to be forwarded to the origin server, but avoids the bandwidth usage associated with copying. The decision whether to copy or remove may be configured at modules 124, 144 and 164 and may consider bandwidth usage issues, the amount of content to copy and other criteria. For example, modules 124, 144 and 164 may be configured to perform a copy of cached content with the content comprises less than five megabytes of data and to perform a removal when more than five megabytes of content are involved.

Continuing the example of FIG. 2, the distribution has changed such that domains starting with I–M, previously cached at client 102, and domains starting with N–P, previously cached at client 106, are now being cached at client 104. Thus, cached content may be moved or copied from clients 102 and 106 to portion 146 at client 104.

At state 308, modules 124, 144 and 164 cache content in portions 126, 146 and 166 and respond to requests 32 as described in FIG. 3. At state 310, modules 124, 144 and 164 may also collect statistical data associated with clients 102, 104 and 106. Statistical data may comprise processor and/or bandwidth usage, such as with respect to the time of day, time between crashes or reboots, web surfing habits and any other suitable statistical information associated with clients 102, 104 and 106. The statistical data may be stored by modules 124, 144 and 164 for use in negotiating distributions and may also be communicated to a remote site. The statistical data may be communicated to the remote site for storage and use for marketing and advertising purposes. For example, a corporation may use the statistical information to learn about the surfing habits of its employees.

Then, at step 312, cache module 168 begins to deactivate and broadcasts cache status message 170 indicating "cache off" to clients 102 and 104. Modules 124 and 144 receiving cache status message 170 indicating a cache shutdown respond by renegotiating the cache distribution between the remaining active modules 124 and 144. More specifically, modules 124 and 144 may redistribute cached content such that domains starting with A–M are cached at client 102, while domains starting with N–Z are cached at client 104. Location tables 128 and 148 are updated to indicate the new content distribution. Next, at step 314, the module 164 clears portion 166. Depending on the configuration of modules 164, clearing portion 166 may include communicating cached content to the remaining clients 102 and 104.

System 10 provides the capability to create a distributed caching system using standard personal computers and the cache module software. Previous caching systems have typically been limited to caching at a single computer, such as the caching performed by web browsers, or have concentrated caching efforts at a single firewall or proxy server. The increasing adoption of "always-on", high-bandwidth Internet connections, such as DSL modems, cable modems and LANs, allows for system 10 to group standard personal computers to form a cache community in order to decrease response time for content requests. In addition, since the cache modules use the existing storage capacity of the client computers, additional hardware does not need to be purchased for the cache community. Also, corporations may benefit from forming community caches over their corporate intranet LANs in order to decrease usage of expensive wide-area-network connections, such as T-1 lines, to the Internet.

The use of community caches also provides benefits to Internet Service Providers (ISPs) by decreasing the amount of data transferred between the ISP and the Internet. Since the community caching takes place entirely on the subscriber side of the ISP's infrastructure, an increased number of subscribers can be supported by a given amount of Internet connection bandwidth. For example, if 25% of the content requests from subscribers are handled by the community cache, an approximately 25% decrease in the use of the ISP's public network connection is realized.

Figure 6:
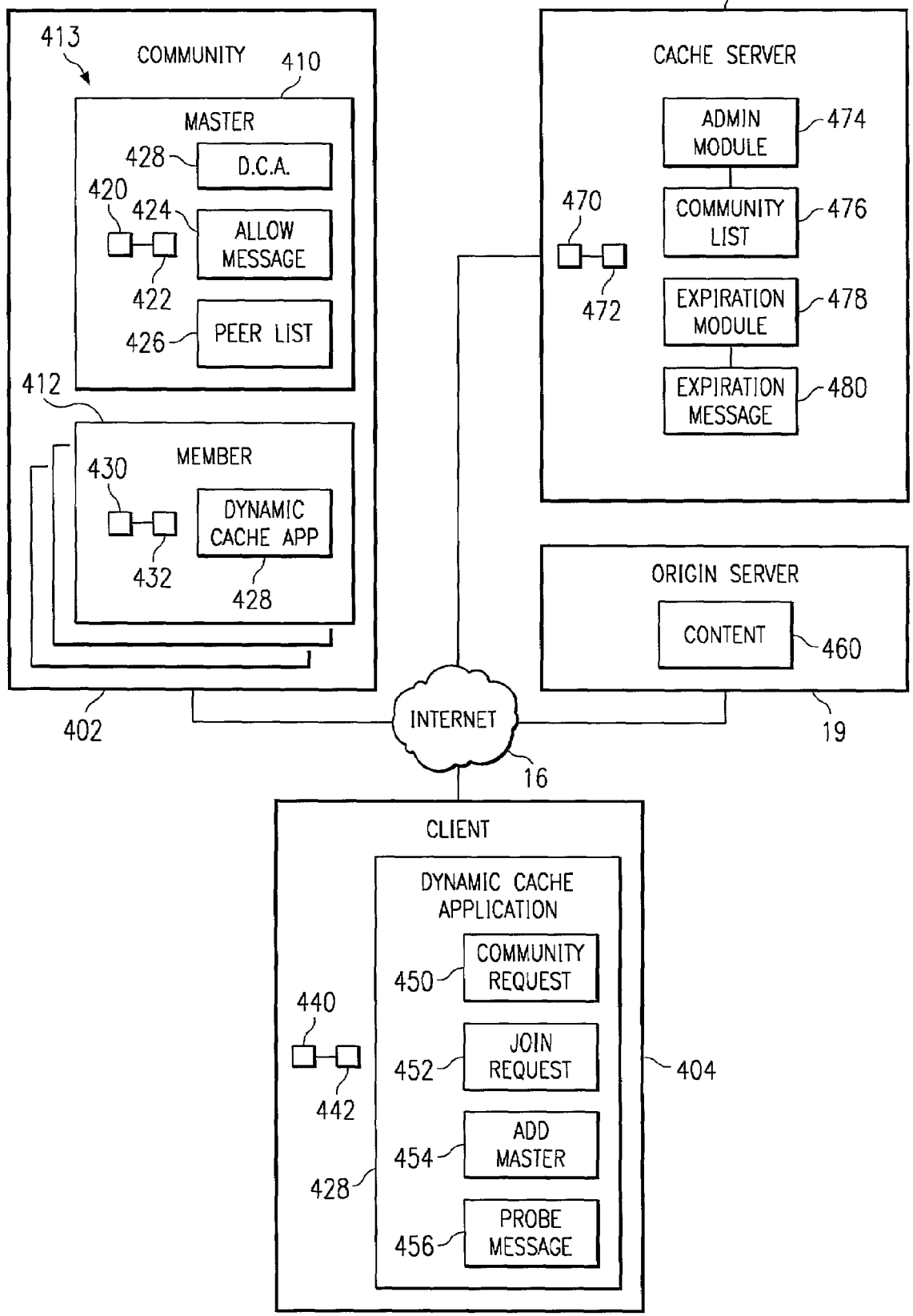
FIG. 6 is a block diagram illustrating a dynamic caching system according to one embodiment of the system of FIG. 1.

FIG. 6 is a block diagram illustrating a dynamic caching system 400 comprising one embodiment of system 10. System 400 comprises a cache community 402, a client 404, a cache server 406, Internet 16, and origin server 19. Dynamic distributed caching system 400 provides the capability for allowing members to dynamically join and leave cache community 402 while continuing to provide a distributed caching system.

Community 402 comprises one or more peers 413. A peer 413 comprises a computer operable to execute logic and/or an application. Peers 413 further comprise a master 410 and a member 412. Community 402, similar to community 15, represents a group of peers 413 which cooperate to form a distributed caching system. Each community 402 includes one or more peers 413. More specifically, each community 402 includes one master 410 and zero or more members 412.

A dynamic caching application 478 at each peer 413 provides functionality to support the distributed caching system 10.

Master 410 comprises a processor 420 and computer readable storage 422. Master 410 may be adapted to execute any of the well known MS-DOS, PC-DOS, OS/2, UNIX, Linux, MAC-OS, mainframe, minicomputer, Windows operating systems or other operating systems. Processor 420 comprises any suitable general purpose or specialized electronic or other processing device, such as a central processing unit (CPU), operable to communicate with storage 422 and execute applications stored in storage 422. Processor 420 may comprise multiple processors. Storage 422 comprises any suitable combination of transient and/or persistent memory operable to store member list 426 and dynamic caching application 428, and to communicate with processor 420. For example, storage 422 may comprise any suitable combination of optical and/or magnetic storage, such as a floppy disk drive, a hard disk drive, a CD-ROM drive or a CD-RW drive. Storage 422 may also represent multiple computer readable storage devices in any combination.

Master 410 is operable to generate an allow message 424 and maintain a peer list 426. Allow message 424 comprises a data message sent to client 404 to inform client 404 that client 404 is being allowed to join community 402. Allow message 424 may also be sent to client 404 to inform client 404 that entry to community 402 is denied.

Peer list 426 comprises a list of peers 413 in community 402. For example, peer list 426 may compromise a list of the Internet protocol (IP) addresses associated with peers 413.

Dynamic caching application 428 comprises software and/or hardware operable to support caching of data and other content within community 402. Application 428 is described in more detail in FIG. 7.

Member 412 comprises a processor 430, computer readable storage 432 and dynamic caching application 428. Processor 430 comprises any suitable general purpose or specialized electronic processing device, such as a CPU, operable to communicate with storage 432. Processor 430 may comprise multiple processors. Storage 432 comprises any suitable combination of transient and/or persistent memory operable to store peer list 426 and dynamic caching application 428, and to communicate with processor 430. For example, storage 432 may comprise any suitable combination of optical or magnetic computer readable storage mediums such as a floppy disk drive, a hard disk drive, a CD-ROM drive, an optical drive, or a CD-RW drive. Storage 432 may also represent multiple computer readable storage devices in any combination.

Community 402 is comprised of a master 410 and zero or more members 412. Members 412 and master 410 operate to support the caching of content within community 402. More specifically, both master 410 and members 402 provide for a distributed caching system within community 402. In addition to the functionality provided by members 412, master 410 is further responsible for providing administrative support to community 402. In general, a member 412 is capable of being a master 410 as necessary and a member 412 may be designated as a master 410 at any time. Dynamic cache application 428, which executes on both master 410 and members 412, is typically fully capable of providing the functionality associated with being either a master 410 or a member 412.

Client 404 comprises a processor 440, computer readable storage 442 and dynamic caching cache application 428. Client 404 comprises a computer executing dynamic cache application 428 which has not yet joined a community 402.

Processor 440 comprises any suitable general purpose or specialized electronic processing device, such as a CPU, operable to communicate with storage 442. Processor 440 may comprise multiple processors. Storage 442 comprises any suitable combination of transient and/or persistent memory operable to store member list 426 and dynamic caching application 428, and to communicate with processor 440. Storage 442 may further comprise any suitable combination of optical, magnetic or other computer readable storage mediums such as a floppy disk drive, a hard disk drive, a CD-ROM drive, an optical drive or a CD-RW drive. Storage 442 may also represent multiple computer readable storage devices in any combination.

Dynamic cache application 428 is operable to generate a community request 450 and a joined request 452. Community request 450 comprises a data message generated by dynamic cache application 428. Community request 450 requests the network location of communities 402 which client 404 may attempt to join. Community request 450 is communicating to cache server 406.

Join request 452 comprises a data message indicating that client 404 wishes to join a particular community 402. Join request 452 is communicated to a community 402.

Origin server 19 is further operable to provide content 460. Content 460 comprises static and/or dynamically generated information. In one embodiment, content 460 comprises one or more web pages, such as those formatted and linked using the hypertext markup language (HTML). For example, content 460 may comprise audio data, video data, text data, animations, applications, applets and other suitable content retrievable using the hypertext transport protocol (HTTP).

Cache server 406 comprises a processor 470, computer readable storage 472, an administration module 474, a community list 476, an expiration module 478, and is operable to handle an expiration message 480. Cache server 406 comprises one or more servers operable to provide content expiration and community tracking capabilities to system 400. More specifically, cache server 460 maintains a list of communities 402 which a client 404 may attempt to join. Processor 470 comprises any suitable general purpose or specialized electronic processing device, such as a CPU, operable to communicate with storage 472. Processor 470 may comprise multiple processors. Storage 472 comprises any suitable combination of transient and/or persistent memory operable to store member list 426 and dynamic caching application 428, and to communicate with processor 470. Storage 472 may further comprise any suitable combination of optical, magnetic or other computer readable storage mediums such as a floppy disk drive, a hard disk drive, a CD-ROM drive, an optical drive, or a CD-RW drive. Storage 472 may also represent multiple computer readable storage devices in any combination.

Administration module 474 comprises software and/or hardware operable to generate and maintain community list 476. Administration module 474 is further operable to respond to community request 450 from client 404.

Community list 476 comprises a list of communities 402 known to cache server 406 that client 404 may attempt to join. In one embodiment, cache server 406 tracks communities 402 which are close to cache server 406 in terms of network distance. Typically, on a computer network, geographic location is not necessarily a good indicator of response time between that two nodes on a network. The latency between two network nodes is often a better indication of performance. The latency represents the sum of the time the packet has spent waiting to be forwarded out of a particular network node plus the transit time over the link connecting one network node to another node. The latency between two network locations may be used to determine the network distance between the two network locations. Other suitable indications may also be used to determine network distance, such as the number of hops or nodes between two nodes. Administration module 474 may impose an upper and/or a lower limit on the network distance from cache server 406 of communities 402 that may be listed in community list 476.

Expiration module 478 comprises software and/or hardware operable to receive and communicate data expiration messages 480 associated with content 460. Expiration message 480 comprises an indication that content 460 at origin server 19 has changed and that cached copies of content 460 should be marked as stale or out-of-date. Expiration module 478 operates to communicate expiration message 480 to communities 402 listed in community list 476.

In operation, dynamic cache application 428 is initiated at client 404. Dynamic cache application 428 then generates a community request 450. Community request 450 is a request for a list of communities 402 that client 404 may attempt to join. Community request 450 is communicated over Internet 60 to cache server 406. In one embodiment, the cache server 406 contacted by dynamic cache application 428 has been previously determined, such as a particular URL. Alternatively, cache server 406 may be specified by a user associated with client 404. Cache server 406 then receives community request 450 and returns community list 476 to client 404.

Dynamic cache application 428 then examines community list 476 and selects one of the communities 402 listed in community list 476 to attempt to join. For example, dynamic cache application 428 may select a community 402 which has the lowest latency from client 404. Alternatively, dynamic cache application 428 may select the first community 402 in list 476 or may select a community 402 randomly from list 476. In general, dynamic cache application 428 may select a community 402 to attempt to join using any suitable technique.

Once dynamic cache application 428 has selected a particular community 402 to attempt to join, dynamic cache application 420 generates join request 452 and communicates join request 452 to community 402. More specifically, join request 452 is communicated from client 404 to master 410 in community 402 since master 410 is responsible for handling the addition and removal of members 412 from community 402.

Master 410 receives join request 452 and determines whether to allow client 404 to become a member 412 of community 402. Master 410 may use any suitable criteria to determine whether to allow client 404 to join community 402. For example, master 410 may consider whether the addition of client 404 would exceed the maximum number of members 412 that may be in community 402 and/or whether the round trip transit time for data between client 404 and members 412 of community 402 is within a threshold limit. The round trip transmission time may comprise the total length of time a data package from master 410 or members 412 takes to travel to client 404 and return back to the originating master 410 or member 412. Master 410 may attempt to keep round trip transmission times within a certain threshold so as to avoid degrading the caching performance of community 402. If master 410 determines that client 404 is appropriate to be a member of community 402, then dynamic cache application 428 at master 410 generates allow message 424 and communicates allow message 424 to client 404. When allow message 424 indicates that client 404 may join community 402, then dynamic cache application 428 also communicates peer list 426 along with allow message 424 to client 404. If allow message 424 indicates that client 404 is allowed to join community 402, then client 404 has joined community 402.

Master 410 then communicates to members 412 that a new member 412 is joining community 402 by communicating an updated peer list 426 which includes client 404. Dynamic cache application 428 then reallocates the content 460 to be cached by particular members 412 and master 410 so that the newly added client 404 is responsible for some subset of content 460 cached in community 402.

If master 410 determines that client 404 should not be allowed to join community 402, then dynamic cache application 428 may generate allow message 424 with the indication that client 404 has been denied entry to community 402. Alternatively, dynamic cache application 428 may simply ignore join request 452 and allow client 404 to determine that it has rejected from community 402 because no response to join request 452 has been received.

If client 404 receives an allow message 424 indicating denial of entry to community 402 or if client 404 does not receive a response from master 410 within a predetermined period of time, then dynamic cache application 428 will determine that client 404 has been denied entry to community 402. Dynamic cache application 428 will then select a new community 402 from community list 476 and communicate a join request 452 to the newly selected community 402.

When cache server 406 determines that content 460 has changed at origin server 19 or is informed that content 460 has changed at origin server 19, cache server 406 generates expiration message 480. Expiration message 480 is then sent to each master 410 for each community 402 listed in community list 476. Master 410 in community 402 then receives expiration message 480 and communicates expiration message 480 to members 412 so that expired, cached content 460 is marked as stale or expired. In one embodiment, expiration message 480 comprises an ICSP message. When expired content 460 is cached in community 402 and a request for the expired content 460 is received, a new copy of content 460 is retrieved from origin server 19.

Figure 7:
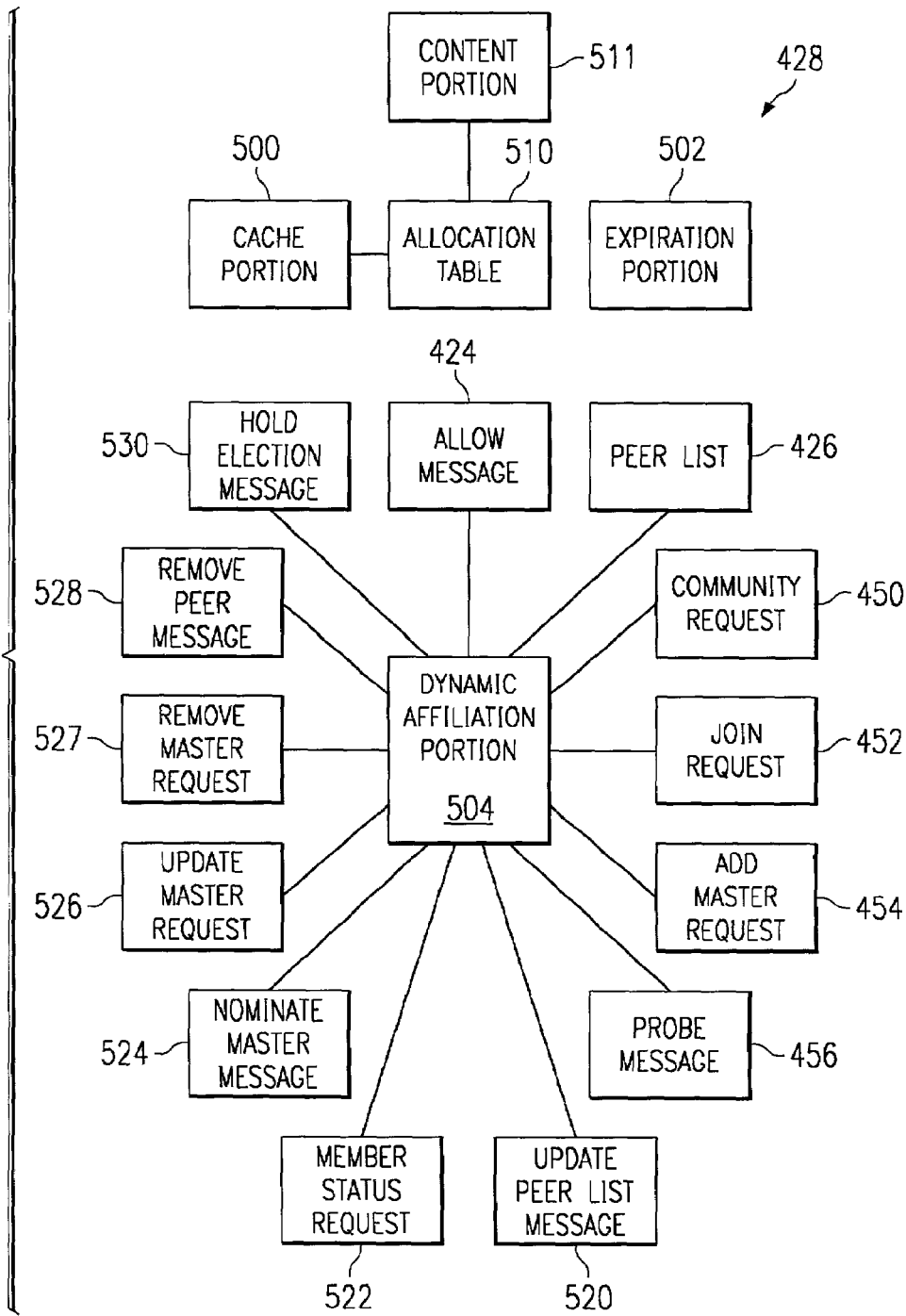
FIG. 7 is a block diagram illustrating details of the dynamic cache application according to one embodiment of the present invention.

FIG. 7 is a block diagram illustrating details of dynamic cache application 428. Dynamic cache application 428 comprises a cache portion 500, an expiration portion 502, and a dynamic affiliation portion 504.

Cache portion 500 comprises software and/or hardware operable to receive any cached content 460. Cache portion 500 is responsible for managing and organizing the actual cache content on the computer readable storage, such as storage 422, 432, or 442. Cache portion 500 is further operable to maintain an allocation list 510 when cache application 428 is acting as a master 410.

Allocation list 510 comprises an indication of which peer 413 caches which content 460. In one embodiment, allocation list 510 comprises location table 148 and the cache shares previously described. In general, any suitable technique may be used for allocating content 468 among peers 413. For example, the CARP protocol may be used to manage distribution of content within community 402.

Expiration portion 502 comprises software and/or hardware operable to receive expiration messages 480 and mark content stored by cache portion 500 as expired. Alternatively, expiration portion 502 may request cache portion 500 to itself mark content as expired. Expiration portion 502 is further operable to propagate expiration message 480 to members 412 in member list 426 when dynamic cache application 428 is operating as a master 410.

Dynamic affiliation portion 504 comprises software and/ or hardware operable to support the dynamic joining and departure of members 412 and master 410 from community 402. Dynamic affiliation portion 504 is further operable to generate and respond to various messages and requests. In particular, dynamic affiliation portion 504 is responsible for supporting allow message 424, community request 450, join request 452, probe message 456 and add master request 454. Dynamic affiliation portion 504 is further operable to provide a peer list message 520, a member status request 522, a nominate master message 524, an update master request 526, a remove peer message 528, a hold election message 530, a location request 550, a location response 554, a probe message 456 and a remove master request 527.

Peer list message 520 comprises a data communication to members 412 of community 402 to update peer list 426 to add or remove peers 413 from community 402. For example, peer list message 520 may include an updated peer list 426 from master 410 for use by members 412. For another example, peer list message 520 may include an instruction to a member 412 to add or delete a particular peer 413 from peer list 426.

Member status request 522 comprises data communicated from dynamic affiliation module 504 at master 410 to a member 412 to determine the status of the member 412. More specifically, member status request 522 is used by master 410 to determine whether a member 412 has unexpectedly left community 402, such as by crashing. In one embodiment, member status request 522 may comprise a "ping" type request, such as one based on the Internet Control Message Protocol (ICMP) used with the TCP/IP protocol.

Nominate master message 524 comprises data indicating that a particular peer 413 should be designated as master 410. Update master request 526 comprises data indicating to administration module 474 that community list 476 should be updated to indicate that a particular peer 413 or client 404 has become the master 410 of community 402.

Remove peer message 528 comprises a data message which indicates from master 410 to members 412 that a particular member 412 is leaving community 402 and should be removed from peer list 426. Hold election message 530 comprises a data message which indicates that a member 412 has detected the possible departure of master 410 from community 402 in that an election should be held among the remaining members 412 to determine a new master 410.

Location request 550 comprises a data message which indicates a request for the peer 413 which would cache content 460 requested by request 32. Location response 554 comprises a data message which indicates an indication of a peer 413 in community 402 which is responsible for caching the requested content. Probe message 456 comprises a data message which indicates a broadcast and/or multicast request to determine the existence of one or more communities 402.

Remove master request 527 comprises a data message which indicates a request by a master 410 that the cache server 406 remove the community 402 associated with the master 410. More specifically, remove master request 527 is used by master 410 to indicate the shutdown of a cache community 402.

Figure 8:
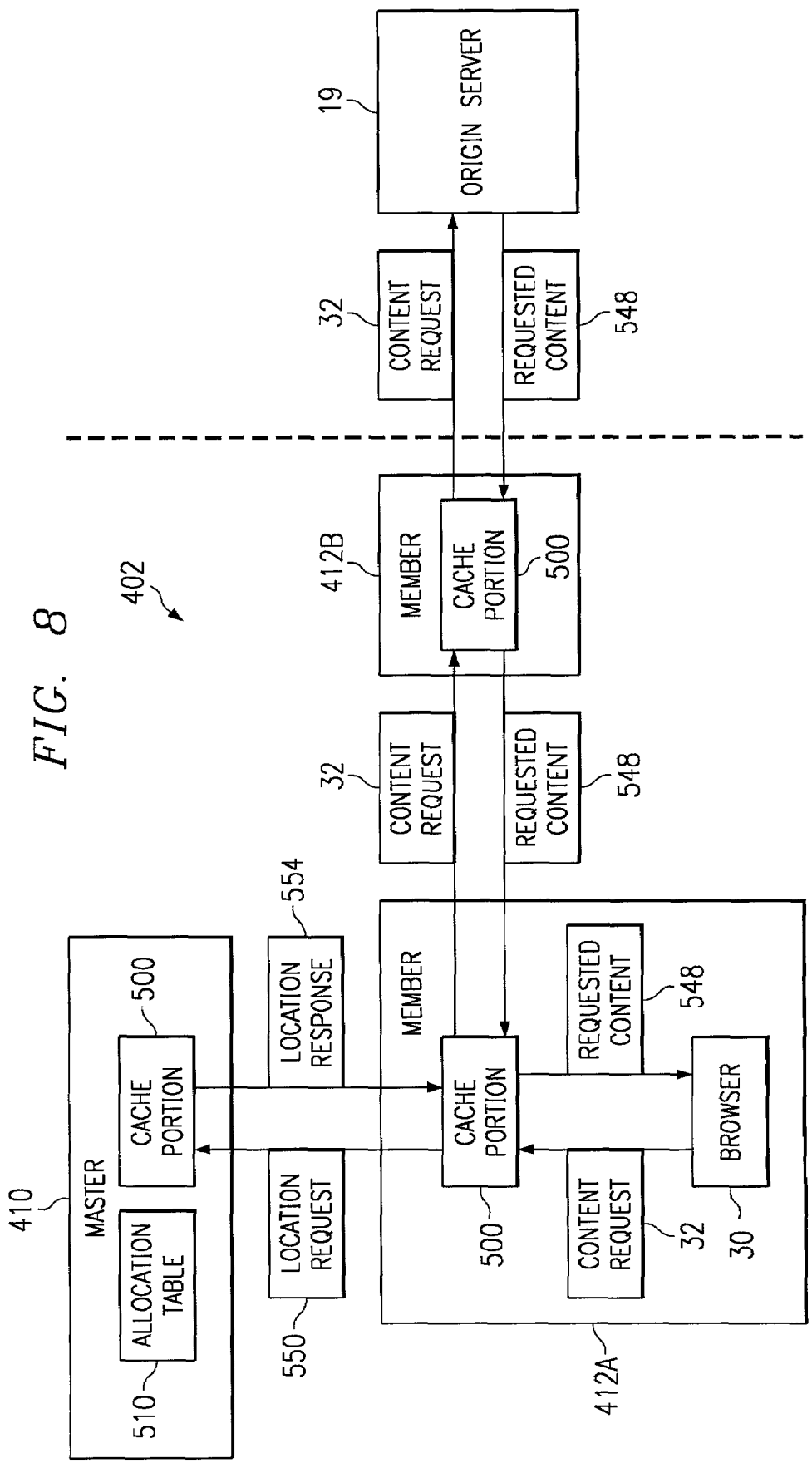
FIG. 8 is a flow diagram illustrating a method for retrieving and caching content within a cache community according to one embodiment of the present invention.

FIG. 8 is a flow diagram illustrating a method for retrieving and caching content within community 402. Initially, a request 32 for requested content 548 is generated by browser 30 in response to, for example, user input. Request 32 is received at cache portion 500 of dynamic cache application 428 at member 412A. Cache portion 500 at member 412A then determines whether the requested content 548 is available in cache portion 500 at member 412A. In general, content is considered "available" at a particular cache portion 500 when the content is stored and unexpired at the particular cache portion 500. Content may be considered unavailable if the content is stored, but marked as expired, or when the content is not stored at the cache portion 500.

If requested content 548 is available at cache portion 500 at member 412A, then cache portion 500 returns requested content 548 to browser 30.

If requested content 548 is unavailable at cache portion 500 at member 412A, then cache portion 500 at member 412A generates location request 550 which is communicated to cache portion 500 at master 410. Cache portion 500 at master 410 examines allocation list 510 to determine which peer 413 would cache the requested content 460.

Cache portion 500 at master 410 determines where the requested content 460 is located and generates a location response 554 which is communicated to member 412A.

Cache portion 500 at member 412A then receives location response 554 and forwards request 32 to the appropriate peer 413. For example, the appropriate peer 413 may be member 412B. Cache portion 500 at member 412B receives request 32 and determines whether the requested content 548 is available and current in cache portion 500 at member 412B. If the requested content 548 is available and current in cache portion 500, then the requested content 548 is returned by member 412B to cache portion 500 at member 412A. Cache portion 500 at member 412A then provides requested content 548 to browser 30 for display to a user associated with member 412A.

If requested content 548 is not available at cache portion 500 at member 412B, then member 412B forwards request 32 to origin server 19. Origin server 19 then returns requested content 548 to cache portion 500 at member 412B. Member 412B then caches requested content 548 at cache portion 500 and forwards requested content 548 to cache portion 500 at member 412A. Cache portion 500 at member 412A then communicates requested content 548 to browser 30 for display to the user.

Figure 9:
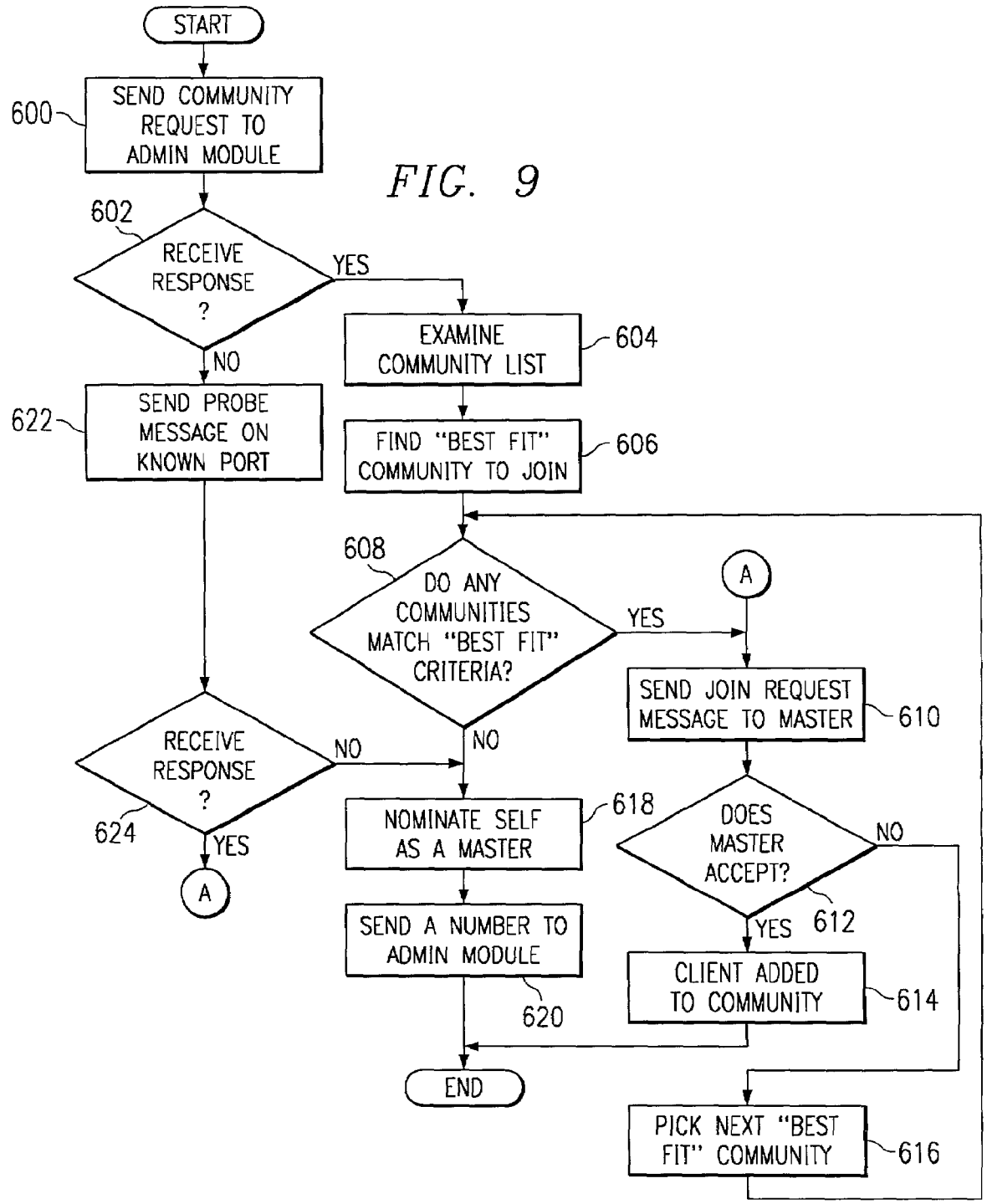
FIG. 9 is a flow chart illustrating a method for adding a client to the cache community according to one embodiment of the present invention.

FIG. 9 is a flow chart illustrating a method for adding a client 404 to community 402. The method begins at step 600, where client 404 sends community request 450 to administration module 474. Next, at step 602, client 404 determines whether a response has been received from administration module 474. More specifically, dynamic cache application 428 determines whether a community list 476 has been received from cache server 406.

If a response is received from administration module 474, then the YES branch of decisional step 602 leads to step 604. At step 604, dynamic cache application 428 examines community list 476. Then, at step 606, dynamic cache application 428 attempts to find a community 402 which comprises a "best fit" community for client 404 to join. More specifically, dynamic cache application 428 may evaluate various factors associated with communities 402 to determine which community 402 or community list 476 client 404 should join. For example, dynamic cache application 428 may determine the round trip transmission time between client 404 and community 402. The round trip transmission time may be useful in determining the overall performance of a community 402 and the performance of a community 402 with respect to client 404. Proceeding to decisional step 608, dynamic cache application 428 determines whether any communities 402 meet the best fit criteria. If one or more communities 402 meet the best fit criteria, then the YES branch of decisional step 608 leads to step 610. At step 610, dynamic cache application 428 sends join request 452 to one of the communities 402 which matched the best fit criteria in step 608. The particular community selected by dynamic cache application 428 may comprise the community 402 which most closely met the best fit criteria. Alternatively, dynamic cache application 428 may use other methods for selecting the first community 402 to contact.

Then, at step 612, dynamic cache application 428 at client 404 determines whether master 410 has accepted client 404 into community 402. Dynamic cache application 428 at client 404 may determine that master 410 has denied client 404 admittance to community 402 by receiving an allow message 424 indicating that client 404 is not allowed to join community 402 or by receiving no response from master 410 within a predetermined time period. If client 404 receives an allow message 424 indicating that client 404 is allowed to join community 402, then the YES branch of decisional step 612 leads to step 614. At step 614, client 404 is added to community 402 by master 410 and member list 426 is updated by master 410.

If master 410 denies client 404 entrance to community 402, then the NO branch of decisional step 612 leads to step 616. At step 616, dynamic cache application 428 at client 404 selects the next community 402 to attempt to join. Also, at step 616, the criteria for the best fit for client 404 may optionally be modified by dynamic cache application 428 so as to change or increase the number of communities 402 that client 404 may join. The method then proceeds to step 608 where communities 402 and community list 476 are evaluated against the best fit criteria which may have changed at step 616.

Returning to decisional step 608, if no communities 402 in community list 476 match the best fit criteria for client 404, then the NO branch of decisional step 608 leads to step 618. At step 618, dynamic cache application 428 at client 404 nominates itself as a master 410. When client 404 nominates itself as a master 410, client 404 creates a new cache community 402. Then, at step 620, add master 454 is sent from client 404 to administration module 474 at cache server 406. Add master 454 indicates to administration module 474 that a new cache community 402 is being generated with client 404 as master 410 and that the new community 402 should be added to community list 476.

Returning to decisional step 602, if client 404 does not receive a response from administration module 474, then the NO branch of decisional step 602 leads to step 622. At step 622, probe message 456 is sent from client 404 to a known port to one or more network nodes. More specifically, dynamic cache application 428 may be configured to listen at a particular location, such as a transmission control protocol/Internet protocol (TCP/IP) port, for clients 404 which wish to join community 402. This capability provides, for example, the capability to add members to a community 402 in the absence of a cache server 406 or when cache server 406 cannot be contacted. Proceeding to decisional step 624, if client 402 receives a response to probe message 456 from a master 410 and a community 402, then the YES branch of decisional 624 leads to step 610 where client 404 will attempt to join the responding community 402. If no response is received to probe message 456, then the NO branch of decisional step 624 leads to step 618 and client 404 will attempt to form its own community 402.

Figure 10:
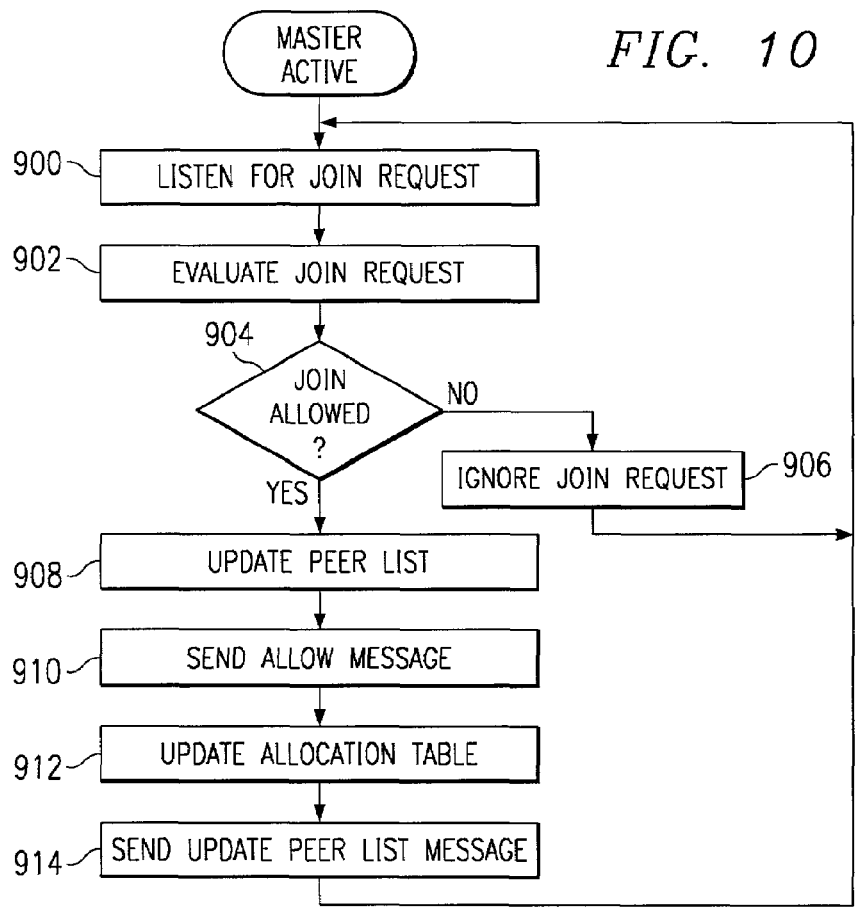
FIG. 10 is a flow chart illustrating a method for allowing the client to join the cache community according to one embodiment of the present invention.

FIG. 10 is a flow chart illustrating a method for allowing a client 404 to join a cache community 402. The method begins at step 900, where a master 410 in a community 402 listens for join request 452 from clients 404. Next, at step 902, dynamic affiliation portion 504 at master 410 evaluates join request 452 to determine whether client 404 will be allowed to join community 402. Master 410 may use any suitable criteria in determining whether to allow client 404 to join community 402, such as whether community 402 has reached a maximum number of peers 413 and the roundtrip transmission time between client 404 and community 402. Next, at decisional step 904, master 410 decides whether client 404 is allowed to join community 402. If client 404 is not allowed to join community 402, then the NO branch of decisional step 904 leads to 906 where join request 452 is ignored by master 410. Alternatively, master 410 may communicate an allow message 424 to client 404 with the indication that client 404 has been denied entry to community 402.

If client 404 is allowed to join community 402, then the YES branch of decisional step 904 leads to step 908. At step 908, peer list 426 is updated to include client 404. Proceeding to step 910, allow message 424 is communicated to client 404 along with the updated peer list 426. Then, at step 912, allocation list table 510 is updated to include client 404 and community 402. More specifically, the distribution of content 460 to be cached within community 402 is adjusted to include the additional capacity provided by client 404. Then, at step 914, update peer list message 520 is sent to members 412 by master 410 to inform members 412 to update peer list 426 at each of the members 412 to include client 404. The method then returns to step 900 where master 410 listens for additional join requests 452.

Figure 11:
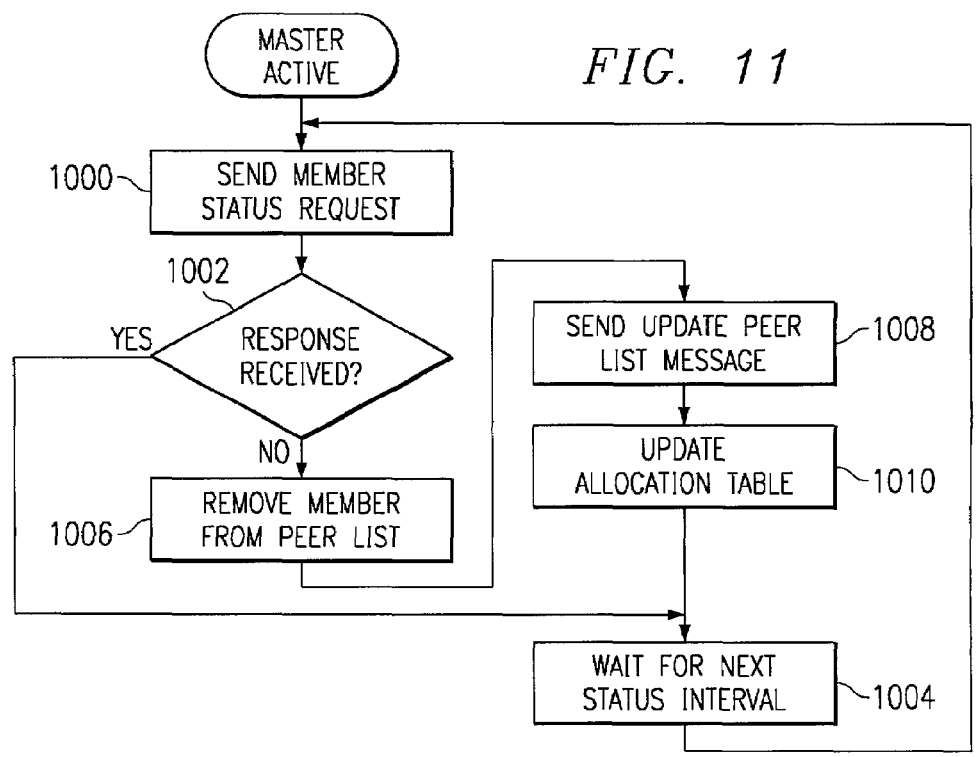
FIG. 11 is a flow chart illustrating a method for determining whether a member of the cache community has unexpectedly departed the cache community according to one embodiment of the present invention.

FIG. 11 is a flow chart illustrating a method for determining whether a member 412 has unexpectedly departed community 402. The method begins at step 1000, where master 410 sends member status request 522 to a selected member 412. The member 412 to send member status request 522 to may be determined using any suitable method. For example, master 410 may sequentially traverse peer list 426 and send member status request 522 to each member 412 listed in peer list 426. Next, at step 1002, master 410 determines whether a response has been received to member status request 522. If a response is received then the YES branch of decisional step 1002 leads to step 1004. At step 1004, master 410 resets the time-out for the member 412 from which the response is received. More specifically, master 410 may have a predetermined time interval after which a particular member 412 is contacted again and the countdown to the expiration of that interval is reset. For example, a member 412 may be contacted once every minute. If no response is received from member 412, then the NO branch of decisional step 1002 leads to step 1006. At step 1006, master 410 removes the member 412 which did not respond from peer list 426. Proceeding to step 1008, master 410 sends update peer list message 512 with the indication that the non-responding member 412 should be removed from the peer list 426 of other members 412. Then, at step 1010, master 410 updates allocation table 510 to account for the loss of the member 412.

FIG. 12 is a flow chart illustrating a method for removing a member 412 from community 402. The method begins at step 1100, where master 410 listens for members which wish to leave community 402. Next, at step 1102, master 410 receives remove peer message 528. Remove peer message 528 indicates that a member 412 wishes to leave community 402. Remove peer message 528 is generated by the member 412 which desires to depart community 402 and is communicated to master 410. Then, at step 1104, master 410 removes the departing member 412 from peer list 426. Proceeding to step 1106, master 410 updates allocation table 510 to account for the departing member 412. Then, at step 1108, master 410 sends update peer list message 520 to the remaining members 412 in community 402 to update their peer lists 426 to remove the departing member 412. The departing member 412 is then removed from community 402 and the method returns to step 1100 where master 410 listens for further departing members.

FIG. 13 is a flow chart illustrating a method for gracefully removing master 410 from community 402. The method begins at step 1200 where master 410 determines that it is going to leave community 402. Then, at decisional step 1201, master 410 determines if it is the only peer 413 in community 402. If master 410 is not the only peer 413 in community 402, then NO branch of decisional step 1201 leads to step 1202. Next, at step 1202, master 410 selects a new master from members 412 in peer list 426. Master 410 may use any suitable method for determining who the new master 410 is to be. For example, master 410 may select the new master 410 based on the amount of bandwidth available at a member 412, the processing capability of member 412, or other suitable criteria. Then, at step 1204, master 410 removes itself from peer list 426. Proceeding to step 1206, master 410 sends nominate master message 524 to the selected member 412 whose become the new master 410 along with the updated peer list 426 which no longer includes the old master 410. Then, at decisional step 1208, the old master determines whether a response has been received from member 412 which is to become the new master 410. If no response is received from the member 412 which is to become the new master, then the NO branch of decisional step 1208 returns to step 1202 where the current master 410 will select a new master 410 from the other members 412 of community 402. If a response is received from member 412 which is to become the new master 410 then the YES branch of decisional step 1208 leads to step 1210. At step 1210, the existing master 410 shuts itself down. Next, at step 1212, the member 412 which was selected as the new master 410 becomes the master 410 and sends update peer list message 520 to the remaining members 412 of community 402. The update peer list message 520 indicates that the remaining members 412 of community 402 should update their peer lists 426 to indicate that the old master 410 is no longer in community 402 and that the new master 410 is the present master 410. Proceeding to step 1214, the new master 410 sends update master request 526 to cache server 406. Update master request 526 indicates to cache server 406 and administration module 474 that community list 476 should be updated to indicate that the new master 410 is the master for community 402.

Returning to decisional step 1201, if master 410 determines that it is the only peer 413 in community 402, then YES branch of decisional step 1201 leads to step 1220. At step 1220, master 410 sends remove master request 527 to cache server 406. Cache server 406 then removes community 402 associated with master 410. Master 410 then shuts down. The method then ends.

Figure 14:
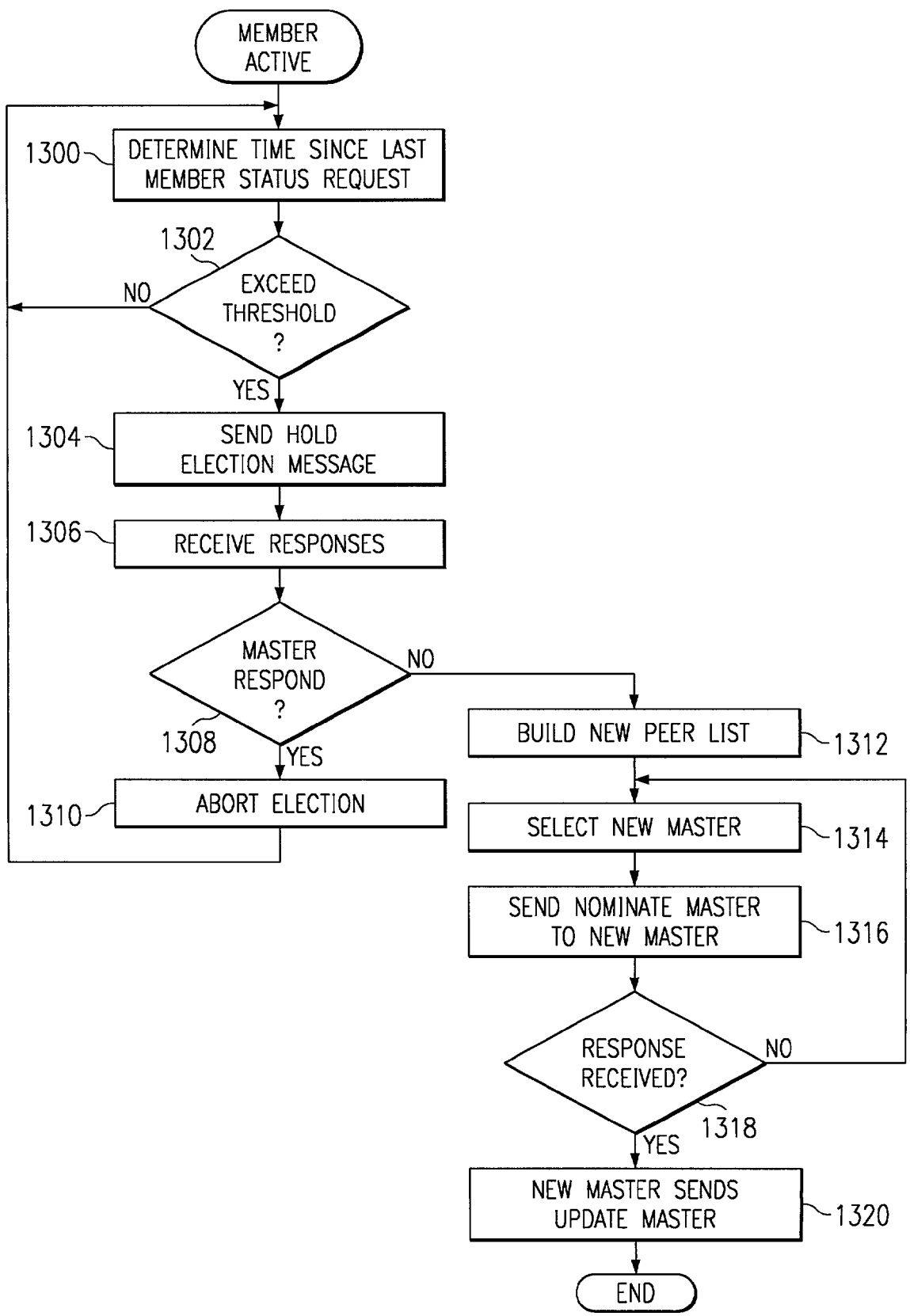
FIG. 14 is a flow chart illustrating a method for allowing the master to unexpectedly depart the cache community according to one embodiment of the present invention.

FIG. 14 is a flow chart illustrating a method for allowing a master 410 to unexpectedly depart community 402. The method begins at step 1300, where a member 412 determines how much time has elapsed since the last member status request 522 was received by member 412. Then, at decisional step 1302, member 412 determines whether the time since the last member status request 522 was received at member 412 exceeds a predetermined threshold. For example, the predetermined threshold may be one minute since the last member status request 522 was received. If the time since the last member status request 522 was received does not exceed the predetermined threshold, then the NO branch of decisional step 1302 returns to step 1300 where member 412 checks the elapsed time again.

If the elapsed time exceeds the predetermined threshold, then the YES branch of decisional step 1302 leads to step 1304. At step 1304, member 412 generates hold election message 530 and communicates hold election message to members 412 in peer list 426. Member 412 generates hold election message 530 to inform other members 412 in community 402 that master 410 may have shut down and that an election for a new master 410 should be held. Proceeding to step 1306, member 412 which generated hold election message 530 may receive one or more responses from members 412 and master 410 in community 402. Then, at step 1308, member 412 which generated hold election message 530 determines whether any response has been received from master 410. If master 410 has responded to hold election message 530, then the YES branch of decisional step 1308 leads to step 1310 where member 412 aborts the attempt to elect a new master 410. Master 410 may respond because master 410 is still operating and was only temporarily unable to generate a member status request 522 for member 412 which generated hold election message 530. If master 410 was only temporarily unavailable, then it is unnecessary for a new master 410 to be elected for community 402.

If no master 410 responds in step 1308, then the NO branch decisional step 1308 leads to step 1312. At step 1312, member 412 generates a new peer list 426 based on responses from members 412 received in step 1306. A new peer list 426 may be generated so as to determine the remaining members of community 402. For example, a communications link connecting master 410 and one or more members 412 to other members 412 in community 402 may unexpectedly shut down. The unexpected loss of a communications link may force community 402 to divide into two separate communities 402 and result in the election of a new master 410 for one of the two new communities 402. Then, at step 1314, a new master 410 is selected from the remaining peers in 413 in the newly generated peer list 426 from step 1312. The new master 410 may be selected in any suitable manner, such as by selecting member 412 which detected that master 410 had ceased to respond. Next, at step 1316, the nominate master message 524 is communicated to member 412 which has been selected to be the new master 410 in step 1314 along with the newly generated peer list 426. Nominate master message 524 is generated by member 412 which originally detected that master 410 had ceased to respond in step 1302. Then, at decisional step 318, member 412 which originally detected that master 410 had ceased to respond determines whether the responses received from the newly nominated master. If no response is received from the newly nominated master, then the NO branch decisional step 1318 returns to step 1314 where another new master is selected from the remaining members 412. If a response is received then the YES branch decisional step 1318 leads to step 1320. At step 1320, the newly nominated master 410 sends update master request 526 to cache server 406 to update community list 476. The method then ends.

In one embodiment, dynamic affiliation portion 504 supports the addition and removal of members 412 and master 410 using the Dynamic Reef Protocol (DRP). In the DRP, community request 450 comprises a CRMSG_WAKEUP data message, add master request 454 comprises a CRMSG_ADDMASTER data message, update master request 526 comprises a CRMSG_REPLACEMASTER data message, remove master request 527 comprises a CRMSG_REMOVEMASTER data message, join request 452 comprises a CRMSG_REQUESTTOJOIN data message, nominate master message 524 comprises a CRMSG_NOMINATEMASTER data message, update peer list message 520 comprises a CRMSG_UPDATEPEERLIST data message, remove peer message 528 comprises a CRMSG_REMOVEPEER data message, hold election message 530 comprises a CRMSG_HOLDELECTION data message, and member status request 522 comprises a CRMSG_PEERPING data message. In addition, probe message 456 may use the CRMSG_WAKEUP data message. The DRP data messages may be organized using any suitable format. For example, a bit pattern may be used in a type field of a data message to indicate the type of data message being sent. For another example, the DRP may be built on top of or as part of the ICSP protocol.

By providing the capability to cache data in a cache community, system 400 provides the ability to cache large amounts of content to the user. Traditionally, caching of Internet content has been done only at an individual user's computer. This provides the benefits of caching data only after the user has retrieved the data from a remote web server. By providing the capability for computers to join a cache community, content stored in the cache community can be quickly provided to the members without having to retrieve the content from an origin server over a possibly slow Internet. As the use of high-speed connections to the Internet, such as Digital Subscriber Line (DSL) and cable modem technologies, increases, the increased responsiveness of a cache community using high-speed connections may be significant in comparison to the responsiveness of the Internet in general.

In addition, traditional distributed caching solutions have used static, predefined groups cache servers. In contrast, system 400 provides the capability to dynamically add and remove members from a distributed caching community. By allowing dynamic addition and subtraction of members from a distributed caching community, a distributed caching system is supported which does not require a centralized administrator. Also, system 400 supports creating a distributed caching system with heterogeneous computers that may be added and removed from the caching community in a dynamic manner.

Other changes, substitutions and alterations are also possible without departing from the spirit and scope of the present invention, as defined by the following claims.

What is claimed is:

1. A method for dynamic distributed data caching comprising:
   providing a cache community on a first side of a point of presence, the cache community comprising at least one peer, the cache community being associated with content obtained from a second side of the point of presence, the content being cached by the at least one peer;
   allowing a client to join the cache community;
   updating a peer list associated with the cache community to include the client, the peer list indicating the peers in the cache community;
   associating the content with the client based on joinder of the client;
   re-allocating the cache storage of the content among the peers in the cache community in response to allowing the client to join the community.

2. The method for dynamic distributed data caching according to claim 1 and further comprising:

receiving a join request from the client; and
determining whether to allow the client to join the cache community.

3. The method dynamic distributed data caching according to claim 2, wherein the join request comprises a CRMSG_REQUESTTOJOIN data message.

4. The method for dynamic distributed data caching according to claim 1, wherein allowing the client to join the cache community comprises:
generating an allow message;
associating the peer list with the allow message; and
communicating the allow message to the client.

5. The method for dynamic distributed data caching according to claim 4, wherein allowing the client to joint the cache community comprises:
generating an allow message comprising the peer list updated to include the client;
communicating the allow message to the client; and
communicating the allow message to at least one member associated with the cache community.

6. The method for dynamic distributed data caching according to claim 4, wherein the allow message comprises a CRMSG_UPDATEPEERLTST data message.

7. The method for dynamic distributed caching according to claim 4, wherein the peer list associated with the allow message comprises the updated peer list which includes the client.

8. The method for dynamic distributed data caching according to claim 1, wherein the point of presence is an ISP.

9. The method for dynamic distributed data caching according to claim 1, wherein a one of the peers comprises a member.

10. The method for dynamic distributed data caching according to claim 1, wherein a one of the peers comprises a master.

11. The method for dynamic distributed data caching according to claim 1, wherein associating the content with the client comprises:
allocating the content to peers in the peer list; and
updating an allocation table to indicate the content associated with the peers.

12. The method for dynamic distributed data caching according to claim 11, wherein the content is cached at more than one peer.

13. The method for dynamic distributed data caching according to claim 11, wherein the content includes a plurality of internet protocol domain names.

14. The method for dynamic distributed data caching according to claim 1 and further comprising removing the association between the content and the peers.

15. A system for dynamic distributed data caching comprising:
logic encoded on storage and operable to:
provide a cache community on a first side of a point of presence, the cache community comprising at least one peer, the cache community being associated with content obtained from a second side of the point of presence, the content being cached by the at least one peer;
allow a client to join the cache community;
update a peer list associated with the cache community to include the client, the peer list indicating the peers in the cache community;
associate the content with the client based on joinder of the client;
re-allocate the cache storage of the content among the peers in the cache community in response to allowing the client to join the community.

16. The system for dynamic distributed data caching according to claim 15, wherein the logic is further operable to:
receive a join request from the client; and
determine whether to allow the client to join the cache community.

17. The system for dynamic distributed data caching according to claim 16, wherein the join request comprises a CRMSG_REQUESTTOJOIN data message.

18. The system for dynamic distributed data caching according to claim 15, wherein the logic is further operable to:
generate an allow message;
associate the peer list with the allow message;
communicate the allow message to the client.

19. The system for dynamic distributed data caching according to claim 18, wherein the logic is further operable to:
generate an allow message comprising the peer list updated to include the client;
communicate the allow message to the client; and
communicate the allow message to at least one member associated with the cache community.

20. The system for dynamic distributed data caching according to claim 18, wherein the allow message comprises a CRMSG_UPDATEPEERLIST data message.

21. The system for dynamic distributed caching according to claim 18, wherein the peer list associated with the allow message comprises the updated peer list which includes the client.

22. The system for dynamic distributed data caching according to claim 15, wherein the point of presence is an ISP.

23. The system for dynamic distributed data caching according to claim 15, wherein a one of the peers comprises a member.

24. The system for dynamic distributed data caching according to claim 15, wherein a one of the peers comprises a master.

25. The system for dynamic distributed data caching according to claim 15, wherein the logic is further operable to:
allocate the content to peers in the peer list; and
update an allocation table to indicate the content associated with the peers.

26. The system for dynamic distributed data caching according to claim 25, wherein the content is cached at more than one peer.

27. The system for dynamic distributed data caching according to claim 25, wherein the content includes a plurality of internet protocol domain names.

28. The system for dynamic distributed data caching according to claim 15, wherein the logic is further operable to remove the association between the content and the peers.

29. A method for dynamic distributed data caching comprising:
communicating a community request to an administration module;
receiving a community list from the administration module in response to the community request, the community list including a list of communities;
selecting one of the communities to attempt to join;
generating a join request to attempt to join the selected one of the communities;

receiving an allow message associated with the selected one of the communities;

receiving a peer list associated with the selected one of the communities;

receiving content allocated for storage in caches of peers in the peer list for cache storage re-allocation in response to joining the selected one of the communities; and providing content for cache storage re-allocation to peers in the peer list in response to joining the selected one of the communities.

30. The method for dynamic distributed data caching according to claim 29, wherein the community request comprises a CRMSG_WAKEUP data message.

31. The method for dynamic distributed data caching according to claim 29, wherein the join request comprises a CRMSG_REQUESTTOJOTN data message.

32. A system for dynamic distributed data caching comprising:

logic encoded on storage and operable to:
communicate a community request to an administration module;

receive a community list from the administration module in response to the community request, the community list including a list of communities;

select one of the communities to attempt to join;

generate a join request to attempt to join the selected one of the communities;

receive an allow message associated with the selected one of the communities;

receive a peer list associated with the selected one of the communities;

receive content allocated for storage in caches of peers in the peer list for cache storage re-allocation in response to joining the selected one of the communities; and provide content for cache storage re-allocation to peers in the peer list in response to joining the selected one of the communities.

33. The system for dynamic distributed data caching according to claim 32, wherein the community request comprises a CRMSG_WAKEUP data message.

34. The system for dynamic distributed data caching according to claim 32, wherein the join request comprises a CRMSG_REQUESTTOJOTN data message.

35. A system for dynamic distributed data caching comprising:

means for providing a cache community on a first side of a point of presence, the cache community comprising at least one peer, the cache community being associated with content obtained from a second side of the point of presence, the content being cached by the at least one peer;

means for allowing a client to join the cache community;

means for updating a peer list associated with the cache community to include the client, the peer list indicating the peers in the cache community;

means for associating the content with the client based on joinder of the client;

means for re-allocating the cache storage of the content among the peers in the cache community in response to allowing the client to join the community.

36. A system for dynamic distributed data caching comprising:

means for communicating a community request to an administration module;

means for receiving a community list from the administration module in response to the community request, the community list including a list of communities;

means for selecting one of the communities to attempt to join;

means for generating a join request to attempt to join the selected one of the communities;

means for receiving an allow message associated with the selected one of the communities;

means for receiving a peer list associated with the selected one of the communities;

means for receiving content allocated for storage in caches of peers in the peer list for cache storage re-allocation in response to joining the selected one of the communities; and means for providing content for cache storage re-allocation to peers in the peer list in response to joining the selected one of the communities.

* * * * *